(12) United States Patent  
Zou et al.

(10) Patent No.: US 12,332,409 B2  
(45) Date of Patent: Jun. 17, 2025

(54) OPTICAL SYSTEM, CAMERA MODULE AND ELECTRONIC DEVICE

(71) Applicant: JIANGXI JINGCHAO OPTICAL CO., LTD., Nanchang (CN)

(72) Inventors: Jinhua Zou, Nanchang (CN); Binbin Liu, Nanchang (CN); Ming Li, Nanchang (CN)

(73) Assignee: JIANGXI JINGCHAO OPTICAL CO., LTD, Nanchang (CN)

( * ) Notice: Subject to any disclaimer, the term of this patent is extended or adjusted under 35 U.S.C. 154(b) by 809 days.

(21) Appl. No.: 17/606,027

(22) PCT Filed: Nov. 29, 2019

(86) PCT No.: PCT/CN2019/122072  
§ 371 (c)(1),  
(2) Date: Oct. 23, 2021

(87) PCT Pub. No.: WO2021/102943  
PCT Pub. Date: Jun. 3, 2021

(65) Prior Publication Data  
US 2022/0206262 A1   Jun. 30, 2022

(51) Int. Cl.  
*G02B 13/00* (2006.01)  
*G02B 9/36* (2006.01)  
*G02B 5/20* (2006.01)

(52) U.S. Cl.  
CPC .............. *G02B 13/004* (2013.01); *G02B 9/36* (2013.01); *G02B 5/208* (2013.01)

(58) Field of Classification Search  
CPC .......... G02B 9/34; G02B 9/36; G02B 13/004; G02B 15/22; G02B 15/24; G02B 15/26;  
(Continued)

(56) References Cited

U.S. PATENT DOCUMENTS

| 4,981,344 A | 1/1991 | Ueda |
| 6,414,800 B1 | 7/2002 | Hamano |
(Continued)

FOREIGN PATENT DOCUMENTS

| CN | 1206842 A | 2/1999 |
| CN | 1297164 A | 5/2001 |
(Continued)

OTHER PUBLICATIONS

R. Paschotta, "Sag Equation", article on "Aspheric Optics" in the RP Photonics Encyclopedia, https://doi.org/10.61835/x7h (Year: 2024).*

(Continued)

*Primary Examiner* — Marin Pichler  
(74) *Attorney, Agent, or Firm* — Franklin & Associates International Inc; Matthew F. Lambrinos

(57) ABSTRACT

Disclosed is an optical system (10) sequentially comprising, from an object side to an image side, a first lens (L1) having a positive refraction power, a second lens (L2), a third lens (L3) and a fourth lens (L4). An image side surface (S8) of the fourth lens (L4) is a concave surface on an optical axis, both an object side surface (S7) and the image side surface (S8) of the fourth lens (L4) are aspheric surfaces, and at least one of the object side surface (S7) and the image side surface (S8) of the fourth lens (L4) has a point of inflexion. The optical system (10) comprises a stop (STO), the stop (STO) being arranged between the object side of the first lens (L1) and the fourth lens (L4), and the optical system (10) satisfies: $0.5<SL/TTL<0.9$, and $-1<SAG31/CT3<0$.

19 Claims, 8 Drawing Sheets

(58) Field of Classification Search
CPC .. G02B 15/28; G02B 13/0015; G02B 13/002; G02B 9/56; G02B 5/208
USPC ....... 359/715, 771, 772, 773, 774, 775, 778, 359/779, 780
See application file for complete search history.

(56) References Cited

U.S. PATENT DOCUMENTS

| | | | |
|---|---|---|---|
| 6,985,309 | B2 | 1/2006 | Shinohara |
| 8,817,386 | B2* | 8/2014 | Hsu ........................... G02B 9/34 359/772 |
| 9,057,868 | B1 | 6/2015 | Chung et al. |
| 9,964,734 | B2* | 5/2018 | Lai ........................ G02B 13/06 |
| 10,175,455 | B2* | 1/2019 | Lai ..................... G02B 27/0025 |
| 10,429,623 | B2* | 10/2019 | Lai ....................... G02B 13/008 |
| 10,838,172 | B2* | 11/2020 | Kang ..................... H04N 23/54 |
| 2004/0218285 | A1 | 11/2004 | Amanai |
| 2004/0264003 | A1 | 12/2004 | Noda |
| 2005/0046970 | A1 | 3/2005 | Amanai |
| 2008/0043343 | A1* | 2/2008 | Chen ........................ G02B 9/34 359/689 |
| 2008/0106801 | A1 | 5/2008 | Kang et al. |
| 2010/0254029 | A1 | 10/2010 | Shinohara |
| 2012/0075718 | A1 | 3/2012 | Seo |
| 2012/0113310 | A1* | 5/2012 | Huang ..................... G02B 9/34 348/340 |
| 2013/0155526 | A1* | 6/2013 | Hsieh ....................... G02B 9/34 359/715 |
| 2014/0063620 | A1 | 3/2014 | Jung et al. |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2017/0219799 | A1* | 8/2017 | Hsueh .................. G02B 13/004 |
| 2017/0307858 | A1 | 10/2017 | Chen |
| 2018/0113282 | A1 | 4/2018 | Tsai |
| 2018/0188478 | A1* | 7/2018 | Chang ..................... G02B 9/34 |
| 2018/0307006 | A1* | 10/2018 | Kang ..................... G02B 9/36 |
| 2019/0204570 | A1* | 7/2019 | Song ................... G02B 13/008 |
| 2020/0073092 | A1 | 3/2020 | Chen |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2020258269 A1 | 12/2020 |

(56) References Cited

FOREIGN PATENT DOCUMENTS

| WO | 2021026869 A1 | 2/2021 |
|---|---|---|
| WO | 2021072745 A1 | 4/2021 |
| WO | 2021087661 A1 | 5/2021 |
| WO | 2021087669 A1 | 5/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |
| WO | 2021184167 A1 | 9/2021 |
| WO | 2021203277 A1 | 10/2021 |
| WO | 2021217504 A1 | 11/2021 |
| WO | 2021217664 A1 | 11/2021 |

OTHER PUBLICATIONS

International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.

* cited by examiner

OPTICAL SYSTEM, CAMERA MODULE AND ELECTRONIC DEVICE

CROSS-REFERENCE TO RELATED APPLICATIONS

This application is a national stage, filed under 35 U.S.C. § 371, of International Patent Application No. PCT/CN2019/122072, filed on Nov. 29 2019, the contents of which are incorporated by reference herein in its entirety.

TECHNICAL FIELD

The present disclosure relates to a field of optical imaging, in particular to an optical system, a camera module, and an electronic device.

BACKGROUND

In recent years, with the continuous development of photography technology, consumers' demands for diversified functions of camera modules and high imaging quality have increased day by day. However, for general camera modules, when the camera module is used for macro capturing, the relative brightness at an edge of field of view of the optical system is insufficient, resulting in poor imaging quality.

SUMMARY

According to embodiments of the present disclosure, an optical system, a camera module, and an electronic device are provided.

An optical system includes, successively in order from an object side to an image side: a first lens having a positive refractive power; a second lens having a refractive power; a third lens having a refractive power; and a fourth lens having a refractive power, an image side surface of the fourth lens being concave on an optical axis, an object side surface and the image side surface of the fourth lens being aspherical, and at least one of the object side surface and the image side surface of the fourth lens having an inflection point; wherein the optical system further comprises a stop arranged between an object side of the first lens to the fourth lens; and the optical system satisfies a condition: $0.5 < SL/TTL < 0.9$; $-1 < SAG31/CT3 < 0$; where SL is a distance from the stop to an imaging surface of the optical system on the optical axis, TTL is a distance from an object side surface of the first lens to the imaging surface of the optical system on the optical axis, and SAG31 is a vector height of an object side surface of the third lens, and CT3 is a thickness of the third lens on the optical axis.

A camera module includes a photosensitive element and the optical system as described above. The photosensitive element is arranged on an image side of the fourth lens.

An electronic device includes a housing and the camera module as described above. The camera module is provided on the housing.

Details of one or more embodiments of the present disclosure will be given in the following description and attached drawings. Other features, objects and advantages of the present disclosure will become apparent from the description, drawings, and claims.

BRIEF DESCRIPTION OF THE DRAWINGS

In order to better describe and illustrate the embodiments and/or examples of the contents disclosed herein, reference may be made to one or more drawings. Additional details or examples used to describe the drawings should not be considered as limiting the scope of any of the disclosed contents, the currently described embodiments and/or examples, and the best mode of these contents currently understood.

DETAILED DESCRIPTION OF THE EMBODIMENTS

Figure 1:
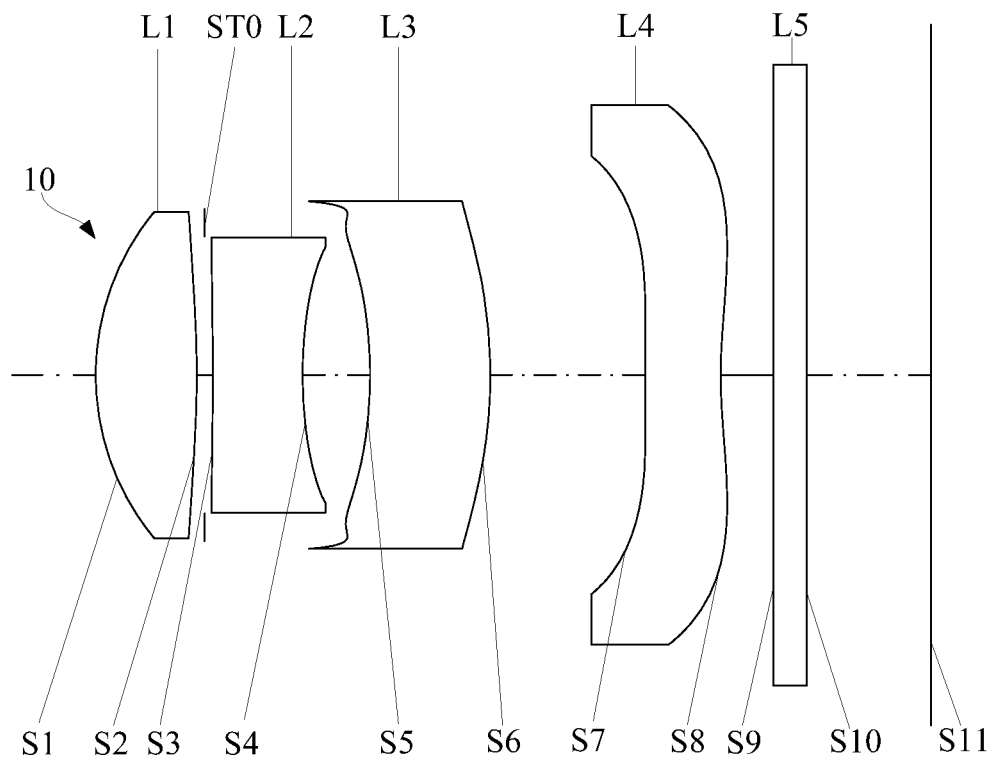
FIG. 1 is a schematic view of an optical system according to a first embodiment of the present disclosure.

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to make the disclosure of the present disclosure more thorough and comprehensive.

It should be noted that when an element is referred to as being "fixed to" another element, it can be directly on another element or an intervening element may also be present therebetween. When an element is considered to be "connected to" another element, it can be directly connected to another element or an intervening element may be present at the same time. Terms "inner", "outer", "left", "right" and similar expressions used herein are for illustrative purposes only, and do not mean that they are the only embodiments.

Referring to FIG. 1, in an embodiment of the present disclosure, the optical system 10 includes, successively in order from an object side to an image side, a first lens L1 having a positive refractive power, a second lens L2 having a refractive power, a third lens L3 having a refractive power, and a fourth lens L4 having a refractive power. The optical system 10 further includes a stop STO. The stop STO is arranged between the first lens L1 and the second lens L2. The lenses and the stop STO in the optical system 10 are coaxially arranged. That is, centers of the lenses and the stop STO are all located on the same straight line, which may also be referred to as an optical axis of the optical system 10.

In some embodiments, the stop STO may also be arranged on an object side of the first lens L1. In other embodiments, the stop STO is arranged between the first lens L1 and the fourth lens L4, for example, between the second lens L2 and the third lens L3 or between the third lens L3 and the fourth lens L4. On the other hand, in some embodiments, the stop STO can be provided on an object side surface or an image side surface of any lens in the optical system 10. As such, a projection of the stop STO on the optical axis overlaps a projection of the lens on the optical axis. From above, it can be understood that the stop STO can be arranged between the object side of the first lens L1 and the fourth lens L4.

In this embodiment, the first lens L1, the second lens L2, the third lens L3, and the fourth lens L4 each include only one lens. However, it should be noted that in some embodiments, any one of the first lens L1, the second lens L2, the third lens L3, and the fourth lens L4 may be a lens group composed of two or more lenses. For example, the first lens L1, the second lens L2, and the third lens L3 each include only one lens, and the fourth lens L4 is composed of two or more lenses. Alternatively, the first lens L1 and the second lens L2 each include only one lens, and the third lens L3 and the fourth lens L4 each include two lenses.

The first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. In addition, the optical system 10 has an imaging surface S11. The imaging surface S11 is located on an image side of the fourth lens L4. Incident light can be imaged on the imaging surface S11 after being adjusted by the lenses of the optical system 10. To facilitate understanding, the imaging surface S11 can be regarded as a photosensitive surface of a photosensitive element. The optical system 10 further has an object surface, and a subject on the object surface can be imaged clearly on the imaging surface S11.

In this embodiment, the object side surface S7 and the image side surface S8 of the fourth lens L4 are both aspherical, and both the object side surface S7 and the image side surface S8 of the fourth lens L4 have inflection points. In some embodiments, the object side surfaces and the image side surfaces of the first lens L1 to the fourth lens L4 are both aspherical, and at least one of the object side surface S7 and the image side surface S8 of the fourth lens L4 has an inflection point. By configuring the fourth lens L4 as an aspherical lens and configuring the inflection point on a light-transmitting surface of the fourth lens L4, the aberration of the optical system 10 can be effectively corrected, and the problem of distortion of the field of view can be solved. Meanwhile, the fourth lens L4 can also provide excellent optical effects for the optical system 10 even when it is small and thin. A volume of the optical system 10 is reduced to achieve a miniaturized design.

The calculation of the aspheric surface shape can refer to the following aspheric shape formula:

$$Z = \frac{cr^2}{1 + \sqrt{1 - (k+1)c^2r^2}} + \sum_i A_i r^i$$

where, Z is a distance from a corresponding point on an aspheric surface to a plane tangent to a vertex of the surface, r is a distance from a corresponding point on the aspheric surface to the optical axis, c is a curvature of the vertex of the aspheric surface, k is a conic constant, and Ai is a coefficient corresponding to the $i^{th}$ high-order term in the aspheric surface shape formula.

It should be noted that when describing that a side surface of the lens at the optical axis (a central area of the side surface) is convex, it can be understood that an area of this side surface of the lens close to the optical axis is convex. Therefore, it can also be determined that the side surface is convex at its paraxial area. When describing a side surface of the lens is concave at its circumference, it can be understood that an area of the side surface is concave when approaching the maximum effective radius. For example, when the side surface is convex at the optical axis and is also convex at its circumference, a shape of the side surface in a direction from its center (the optical axis) to its edge may be purely convex, or may be first convex at its center and be then transitioned to be concave, and then become convex when approaching the maximum effective radius. These are only examples to illustrate various shapes and structures (concave-convex condition) of the side surface at the optical axis and the circumference, and the various shapes and structures (concave-convex condition) of the side surface are not fully embodied, but other situations can be derived from the above examples.

Specifically, in some embodiments, the image side surface S8 of the fourth lens L4 has an inflection point. The image side surface S8 is concave at the optical axis and is convex at its circumference. When the fourth lens L4 satisfies the above-mentioned surface shape, it is beneficial to shorten the total length of the optical system 10, while effectively reducing the incident angle of light incident from the edge of field of view onto the imaging surface S11, and improving the light-receiving efficiency of the photosensitive element on the imaging surface S11.

In some embodiments, the first lens L1, the second lens L2, the third lens L3, and the fourth lens L4 are all made of plastic. In other embodiments, the first lens L1 is made of glass, and the second lens L2, the third lens L3, and the fourth lens L4 are all made of plastic. As such, since the lenses on the object side of the optical system 10 are made of glass, the lenses made of glass on the object side have a good resistance to extreme environments, and are not susceptible to aging due to the impact of the environment on the object side, etc. Therefore, when the optical system 10 is in the extreme environments such as exposed to the sun or in high temperature environment, the optical system 10 having this structure can effectively avoid the deterioration of the imaging quality and reduction of the service life of the optical system 10. The lens made of plastic can reduce the weight of the optical system 10 and the manufacture cost, while the lens made of glass can withstand higher temperatures and has excellent optical performance. Of course, the material configuration of each lens in the optical system 10 is not limited to the above embodiments, and any lens may be made of plastic or glass.

In some embodiments, an infrared cut-off filter L5 is arranged on an image side of the fourth lens L4. Alternatively, it can be understood that the infrared cut-off filter L5 is arranged between the fourth lens L4 and the imaging surface S11. The infrared cut-off filter L5 includes an object side surface S9 and an image side surface S10. The infrared cut-off filter L5 is used to filter out infrared light and prevent the infrared light from reaching the imaging surface S11, thereby preventing the infrared light from interfering with normal imaging. The infrared cut-off filter L5 can be assembled with each lens as a part of the optical system 10. Alternatively, when the optical system 10 and the photosensitive element are assembled into a camera module, the infrared cut-off filter L5 is mounted between the optical system 10 and the photosensitive element. In some embodiments, the infrared cut-off filter L5 may also be arranged on the object side of the first lens L1. In addition, in some embodiments, the infrared cut-off filter L5 may be omitted, while a filter coating is provided on any one of the first lens L1 to the fourth lens L4 to achieve the effect of filtering the infrared light.

Above, in some embodiments, in addition to the lenses having the refractive powers, the optical system 10 may include a stop STO, an infrared cut-off filter L5, a protective glass, a photosensitive element, a reflector for changing the incident light path, and other elements.

In some embodiments, the optical system 100 satisfies the following condition:

$$0.5 < SL/TTL < 0.9;$$

$$-1 < SAG31/CT3 < 0;$$

where SL is a distance from the stop STO to the imaging surface S11 of the optical system 10 on the optical axis, TTL is a distance from the object side surface S1 of the first lens L1 to the imaging surface S11 of the optical system 10 on the optical axis, and SAG31 is a vector height of the object side surface S5 of the third lens L3. That is, SAG31 is the vector from the intersection point of the object side surface S5 of the third lens L3 and the optical axis to a portion of this surface at the maximum effective semiaperture on the optical axis. The vector is positive in a direction toward the image side of the optical system 10, and is negative in a direction toward the object side of the optical system 10. CT3 is a thickness of the third lens L3 on the optical axis, or CT3 can be understood as the center thickness of the third lens L3. In some embodiments, the SL/TTL may be 0.600, 0.610, 0.620, 0.650, 0.700, 0.750, 0.800, 0.830, 0.840, 0.850, or 0.860. In some embodiments, the SAG31/CT3 may be −0.840, −0.830, −0.800, −0.750, −0.600, −0.580, −0.500, −0.400, −0.300, −0.200, −0.150, −0.130, or −0.120. When the above conditions and the configuration of the lenses are satisfied, it is beneficial to improve the imaging quality of the optical system 10 during macro capturing, meanwhile the optical system 10 will further have the characteristics of a small depth of field and a blurred background. Specifically, when the optical system 10 satisfies the condition of 0.5<SL/TTL<0.9, the optical system 10 has a stop centering structure, such that the stop STO will be reasonably arranged in the optical system 10. As such, the aperture of the object side surface S1 of the first lens L1 S1 will be increased, such that the light cone angle generated when the light at the edge of field of view enters the optical system 10 can be effectively controlled, and thus, the amount of light passing through the optical system 10 can be adjusted. In this way, the relative brightness at the edge of field of view can be increased, and thus the imaging quality can be improved. When the optical system 10 satisfies −1<SAG31/CT3<0, it is beneficial to correct the distortion and curvature of field of the optical system 10 and improve the imaging quality. When SAG31/CT3≥0, the surface shape of the object side surface S5 of the third lens L3 at its circumference (at the maximum effective semiaperture) is too smooth, resulting in insufficient refractive ability for the light on the off-axis field of view, which is disadvantageous to the corrections of distortion and curvature of field. When SAG31/CT3≤−1, the surface shape of the object side surface S5 of the third lens L3 at its circumference (at the maximum effective semiaperture) is excessively curved, which easily results in poor forming of the lenses, and affects the manufacturing yield.

In some embodiments, the optical system 10 satisfies a condition: 0.4<DT11/DT42<0.9; where DT11 is a maximum effective semiaperture of the object side surface S1 of the first lens L1, and DT42 is a maximum effective semiaperture of the image side surface S8 of the fourth lens L4. In some embodiments, the DT11/DT42 may be 0.580, 0.590, 0.600, 0.650, 0.700, 0.750, 0.800, 0.840, 0.850, 0.860, or 0.870. When the above condition is satisfied, the maximum effective semiapertures of the object side surface S1 of the first lens L1 and the image side surface S8 of the fourth lens L4 will be reasonably configured, which can effectively control the incident angle of the main light and improve the relative brightness at the edge of field of view, thereby improving the imaging quality of the optical system 10.

In some embodiments, the optical system 10 satisfies a condition: 20 mm<OBL<40 mm; where OBL is a distance from the object surface of the optical system 10 to the object side surface S1 of the first lens L1 on the optical axis. The subject located on the object surface can be imaged clearly on the imaging surface S11 of the optical system 10. In some embodiments, the OBL may be 26 mm, 27 mm, 28 mm, 29 mm, or 30 mm. When the optical system 10 satisfies the condition of 20 mm<OBL<40 mm, the subject located on the object surface (or understood to be within the distance) can be imaged clearly on the imaging surface S11 of the optical system 10, and the macro capturing performance of the optical system 10 can be fully embodied.

In some embodiments, the optical system 10 satisfies a condition: 0.1<|SAG41|/CT4<2.0; where SAG41 is a vector height of the object side surface S7 of the fourth lens L4. That is, SAG41 is the vector from the intersection point of the object side surface of the fourth lens L4 and the optical axis to a portion of the surface at the maximum effective semiaperture on the optical axis. The vector is positive in a direction toward to image side of the optical system 10, and is negative in a direction toward the object side of the optical system 10. CT4 is a thickness of the fourth lens L4 on the optical axis. Alternatively, CT4 can be understood as the center thickness of the fourth lens L4. In some embodiments, the |SAG41|/CT4 may be 0.220, 0.240, 0.250, 0.300, 0.350, 0.500, 0.600, 0.650, 0.700, 1.000, 1.300, 1.400, 1.430, or 1.450. When the above condition is satisfied, the incident angle of the main light incident to the imaging surface S11 of the optical system 10 can be reduced, and in this case, the incident angle of the light at the maximum field of view onto the object side surface S7 of the fourth lens L4 can be effectively controlled. As such, when the slope of the object side surface S7 of the four lens L4 changes greatly, the reflected energy caused by uneven coating can be reduced, and the generation of stray light can be avoided.

In some embodiments, the optical system 10 satisfies a condition: −1≤f1/f2≤1; where f1 is an effective focal length of the first lens L1, and f2 is an effective focal length of the second lens L2. The first lens L1 provides a positive refractive power for the optical system 10, thereby facilitating better convergence of the light and entry of the light into the optical system 10, such that the optical system 10 has a telephoto characteristic. In some embodiments, the f1/f2 may be −0.7700, −0.690, −0.650, −0.400, −0.200, 0.200, 0.400, 0.600, 0.700, 0.750, 0.800, 0.820, or 0.840. Specifically, when the optical system 10 satisfies −1≤f1/f2<0, the second lens L2 will provide the negative refractive power for the optical system 10, which is beneficial to the divergence of the light, thereby effectively correcting aberrations. When the optical system 10 satisfies 0<f1/f2≤1, the main surface of the optical system 10 moves forward, such that the focal length of the optical system 10 can be increased, and the optical system 10 has the characteristics of a small field of view and a long focal length, thereby achieving excellent macro capturing effect.

In some embodiments, the optical system 10 satisfies the condition: FNO≤3.55; where FNO is an f-number of the optical system 10. In some embodiments, the FNO may be 2.50, 2.55, 2.60, 2.70, 2.80, 2.90, 3.00, 3.20, 3.40, 3.45, 3.50, or 3.55. When the above condition is satisfied, the amount of light passing through the optical system 10 can be increased. In addition, the optical system 10 can obtain clear and detailed information of the subject in a dark environment or in the case of insufficient light, thereby improving the imaging quality.

In some embodiments, the optical system 10 satisfies a condition: 0.5<CT3/CT2<3.0; where CT3 is a thickness of the third lens L3 on the optical axis, CT2 is a thickness of the second lens L2 on the optical axis. Alternatively, CT3 can be understood as the central thickness of the third lens L3, or CT2 can be understood as the central thickness of the second lens L2. In some embodiments, the CT3/CT2 may be 0.950, 0.960, 1.000, 1.300, 1.500, 1.800, 2.000, 2.200, 2.500, 2.600, 2.650, 2.700, 2.730, or 2.750. When the above condition is satisfied, the relative brightness at the edge of field of view of the optical system 10 can be effectively improved, and the yield rate when assembling the lenses can be improved as well.

In some embodiments, the optical system 10 satisfies a condition: 0.1<R1/R9<0.7; where R1 is a radius of curvature of the object side surface S1 of the first lens L1 at the optical axis, and R9 is a radius of curvature of the image side surface S8 of the fourth lens L4 at the optical axis. In some embodiments, the R1/R9 may be 0.220, 0.230, 0.250, 0.300, 0.350, 0.400, 0.450, 0.470, 0.500, 0.520, or 0.530. When the above condition is satisfied, the incident angle of light when entering the optical system 10 can be reduced, such that the angle of field of view of the optical system 10 becomes smaller.

In some embodiments, the optical system 10 satisfies a condition: −3<(f2+f4)/f<1; where f2 is an effective focal length of the second lens L2, f4 is an effective focal length of the fourth lens L4, and f is an effective focal length of the optical system 10. In some embodiments, (f2+f4)/f may be −2.500, −2.400, −2.00, −1.000, 0.100, 0.200, 0.300, 0.400, or 0.500. When the above condition is satisfied, the effective focal lengths of the second lens L2 and the fourth lens L4 can form a reasonable configuration with the effective focal length of the optical system 10, thus ensuring the magnification of the optical system 10 within the macro capturing distance, ensuring recognition accuracy. Meanwhile, the aberration of the optical system 10 can be reduced, and the imaging quality of the optical system 10 can be improved.

In some embodiments, a photosensitive element is arranged on the image side of the optical system 10. The photosensitive element is used to receive light adjusted by the optical system 10. The optical system 10 and the photosensitive element constitute a camera module. In some of the embodiments, the camera module satisfies a condition: TTL/ImgH<2.65; where ImgH is half of a diagonal length of an effective pixel area on the photosensitive element, or it can be understood that ImgH is half of a diagonal length of an effective pixel area on the imaging surface S11. In some embodiments, TTL/ImgH may be 2.35, 2.40, 2.45, 2.50, 2.55, 2.60, or 2.63. When the above condition is satisfied, the camera module can meet the high pixel requirements while maintaining the miniaturization of the module size.

Next, the optical system 10 of the present disclosure will be described in more specific and detailed embodiments.

First Embodiment

Figure 2:
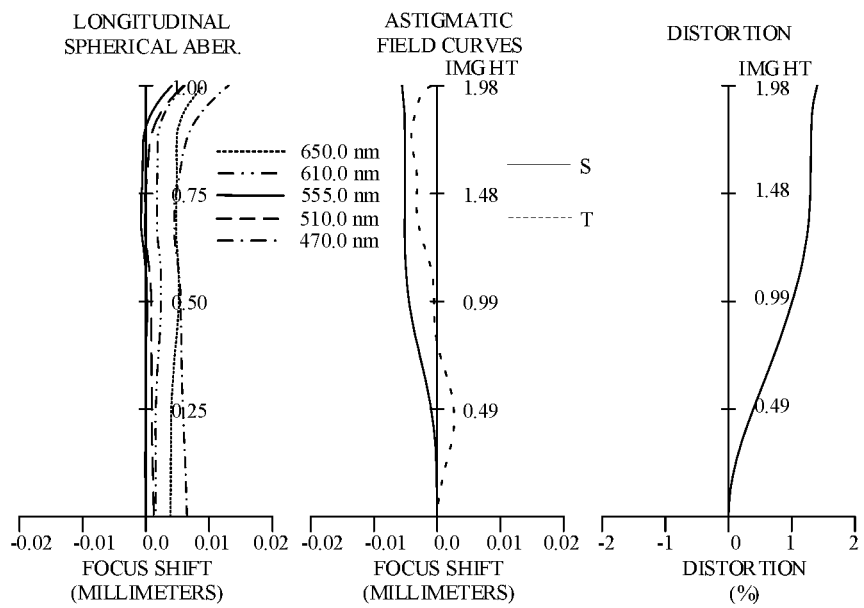
FIG. 2 is a graph showing spherical aberration (mm), astigmatism (mm), and distortion (%) of the optical system according to the first embodiment.

Referring to FIGS. 1 and 2, in the first embodiment, the optical system 10 includes, successively in order from an object side to an image side, a first lens L1 having a positive refractive power, a stop STO, a second lens L2 having a negative refractive power, a third lens L3 having a positive refractive power, and a fourth lens L4 having a negative refractive power. A spherical aberration diagram (mm), an astigmatism diagram (mm), and a distortion diagram (%) of the optical system 10 in the first embodiment is included in FIG. 2. The astigmatism diagram and the distortion diagram are data diagrams at a wavelength of 555 nm.

Ordinates of the astigmatism diagram and the distortion diagram can be understood as half of a diagonal length of an effective pixel area on an imaging surface S11 of the optical system 10.

An object side surface S1 of the first lens L1 is convex at the optical axis and is convex at its circumference. An image side surface S2 of the first lens L1 is convex at the optical axis and is convex at its circumference.

An object side surface S3 of the second lens L2 is concave at the optical axis and is convex at its circumference. An image side surface S4 of the second lens L2 is concave at the optical axis and is concave at its circumference.

An object side surface S5 of the third lens L3 is concave at the optical axis and is concave at its circumference. An image side surface S6 of the third lens L3 is convex at the optical axis and is convex at its circumference.

An object side surface S7 of the fourth lens L4 is convex at the optical axis and is concave at its circumference. An image side surface S8 of the fourth lens L4 is concave at the optical axis and is convex at its circumference. The image side surface S8 of the fourth lens L4 has an inflection point.

Since the image side surface S8 of the fourth lens L4 has the inflection point, and the image side surface S8 is concave at the optical axis and is convex at its circumference, it is beneficial to shorten the total length of the optical system 10 and effectively reduce the incident angle when the light at an edge of field of view is incident onto the imaging surface S11, improving the light-receiving efficiency of a photosensitive element on the imaging surface S11.

The first lens L1, the second lens L2, the third lens L3, and the object side surface S7 and the image side surface S8 of the fourth lens L4 are all aspherical. By matching the aspheric surface shapes of the lenses in the optical system 10, the problem of distortion of the field of view of the optical system 10 can be effectively solved, and the lens can achieve excellent optical effects even when the lenses are small and thin. As such, the optical system 10 has a smaller volume, which is beneficial to the miniaturized design of the optical system 10.

The first lens L1, the second lens L2, the third lens L3, and the fourth lens L4 are all made of plastic. The adoption of the lenses made of plastic can reduce the manufacturing cost of the optical system 10 while reducing the weight of the optical system 10.

It can be seen from FIG. 1 that an infrared cut-off filter L5 is further arranged on an image side of the fourth lens L4 for filtering infrared light. In some embodiments, the infrared cut-off filter L5 is a part of the optical system 10. For example, the infrared cut-off filter L5 is assembled on a lens barrel together with the lenses. In other embodiments, the infrared cut-off filter L5 is mounted between the optical system 10 and the photosensitive element when the optical system 10 and the photosensitive element are assembled into a camera module.

In the first embodiment, the optical system 10 satisfies the following conditions:

$$SL/TTL=0.869;$$

$$SAG31/CT3=-0.184;$$

where SL is a distance from the stop STO to the imaging surface S11 of the optical system 10 on the optical axis, TTL is a distance from the object side surface S1 of the first lens L1 to the imaging surface S11 of the optical system 10 on the optical axis, and SAG31 is a vector height of the object side surface S5 of the lens L3. That is, SAG31 is the vector from the intersection point of the object side surface S5 of the third lens L3 and the optical axis to a portion of this surface at the maximum effective semiaperture on the optical axis. The vector is positive in a direction toward the image side of the optical system 10, and is negative in a direction toward the object side of the optical system 10. CT3 is a thickness of the third lens L3 on the optical axis, or CT3 can be understood as the center thickness of the third lens L3. When the above conditions are satisfied, the macro capturing performance of the optical system 10 can be fully embodied. In this way, it is beneficial to improve the imaging quality of the optical system 10 during macro capturing. As such, the optical system 10 will further have the characteristics of a small depth of field and a blurred background. Specifically, the optical system 10 has a stop centering structure, such that the stop STO will be reasonably arranged in the optical system 10. As such, the aperture of the object side surface S1 of the first lens L1 S1 will be increased, such that the light cone angle generated when the light at the edge of field of view enters the optical system 10 can be effectively controlled, and thus, the amount of light passing through the optical system 10 can be adjusted. In this way, the relative brightness at the edge of field of view can be increased, and thus the imaging quality can be improved. In addition, when the above conditions are satisfied, it is beneficial to correct the distortion and curvature of field of the optical system 10 and improve the imaging quality.

DT11/DT42=0.605; where DT11 is a maximum effective semiaperture of the object side surface S1 of the first lens L1, and DT42 is a maximum effective semiaperture of the image side surface S8 of the fourth lens L4. When the above condition is satisfied, the maximum effective semiapertures of the object side surface S1 of the first lens L1 and the image side surface S8 of the fourth lens L4 will be reasonably configured, which can effectively control the incident angle of the main light and improve the relative brightness at the edge of field of view, thereby improving the imaging quality of the optical system 10.

OBL=30 mm; where OBL is a distance from the object surface of the optical system 10 to the object side surface S1 of the first lens L1 on the optical axis. The subject located on the object surface can be imaged clearly on the imaging surface S11 of the optical system 10. When the above condition is satisfied, the subject located on the object surface (or understood to be within the distance) can be imaged clearly on the imaging surface S11 of the optical system 10, which fully embodies the macro capturing performance of the optical system 10.

|SAG41|/CT4=0.712; where SAG41 is a vector height of the object side surface S7 of the fourth lens L4. That is, SAG41 is the vector from the intersection point of the object side surface S7 of the fourth lens L4 and the optical axis to a portion of the surface at the maximum effective semiaperture on the optical axis. The vector is positive in a direction toward to image side of the optical system 10, and is negative in a direction toward the object side of the optical system 10. CT4 is a thickness of the fourth lens L4 on the optical axis. When the above condition is satisfied, the incident angle of the main light incident to the imaging surface S11 of the optical system 10 can be reduced, and in this case, the incident angle of the light at the maximum field of view onto the object side surface S7 of the fourth lens LA can be effectively controlled. As such, when the slope of the object side surface S7 of the four lens L4 changes greatly, the reflected energy caused by uneven coating can be reduced, and the generation of stray light can be avoided.

f1/f2=−0.646; where f1 is an effective focal length of the first lens L1, and f2 is an effective focal length of the second lens L2. The first lens L1 provides a positive refractive power for the optical system 10, thereby facilitating better convergence of the light and entry of the light into the optical system 10, such that the optical system 10 has a telephoto characteristic. When the above condition is satisfied, the second lens L2 will provide the negative refractive power for the optical system 10, which is beneficial to the divergence of the light, thereby effectively correcting aberrations.

FNO=3.00; where FNO is an f-number of the optical system 10. When the above condition is satisfied, the amount of light passing through the optical system 10 can be increased. In addition, the optical system 10 can obtain clear and detailed information of the subject in a dark environment or in the case of insufficient light, thereby improving the imaging quality.

CT3/CT2=1.339; where CT3 is a thickness of the third lens L3 on the optical axis, CT2 is a thickness of the second lens L2 on the optical axis. When the above condition is satisfied, the relative brightness at the edge of field of view of the optical system 10 can be effectively improved, and the yield rate when assembling the lenses can be improved as well.

R1/R9=0.459; where R1 is a radius of curvature of the object side surface S1 of the first lens L1 at the optical axis, and R9 is a radius of curvature of the image side surface S8 of the fourth lens L4 at the optical axis. When the above condition is satisfied, the incident angle of the light when entering the optical system 10 can be reduced, such that the angle of field of view of the optical system 10 becomes smaller.

(f2+f4)/f=−2.588; where f2 is an effective focal length of the second lens L2, f4 is an effective focal length of the fourth lens L4, and f is an effective focal length of the optical system 10. When the above condition is satisfied, the effective focal lengths of the second lens L2 and the fourth lens L4 can form a reasonable configuration with the effective focal length of the optical system 10, ensuring the magnification of the optical system 10 within the macro capturing distance, ensuring recognition accuracy. Moreover, the aberration of the optical system 10 can be reduced, and the imaging quality of the optical system 10 can be improved.

In some embodiments, a photosensitive element is arranged on the image side of the optical system 10. The photosensitive element is used to receive light adjusted by the optical system 10. The optical system 10 and the photosensitive element constitute a camera module. In some of the embodiments, the camera module satisfies a condition: TTL/ImgH=2.63. When the above condition is satisfied, the camera module can meet the high pixel requirements while maintaining the miniaturization of the module size.

When the refractive power configurations and conditions of the lenses are satisfied, the optical system 10 has a characteristic of a small field of view, and the macro capturing performance of the optical system 10 can be fully embodied, which is beneficial to improve the imaging quality of the optical system 10 during macro capturing. In addition, the optical system 10 will also have the characteristics of a small depth of field and a blurred background.

In addition, various parameters of the imaging lens 100 are shown in Table 1 and Table 2. In table 2, k is a conic constant, and Ai is a coefficient corresponding to the $i^{th}$ high-order term in the aspheric surface shape formula. The elements from the object surface to the image side are arranged in the order of the elements in Table 1 from top to bottom. The surface numbers 1 and 2 indicate the object side surface S1 and the image side surface S2 of the first lens L1, respectively. That is, in the same lens, the surface with the smaller surface number is the object side surface, and the surface with the larger surface number is the image side surface. The Y radius in Table 1 is the radius of curvature of the object side surface or image side surface indicated by corresponding surface number at the paraxial area (or understood as "on the optical axis"). In the "thickness" parameter column of a lens, the first value is the thickness of the lens on the optical axis, and the second value is a distance from the image side surface of the lens to the object side surface of the latter lens on the optical axis. The "thickness" parameter indicated by the surface number 2 is a distance from the image side surface S4 of the second lens L2 to the stop STO. The value of the stop STO in the "thickness" parameter column is the distance from the stop STO to the vertex (the vertex refers to the intersection of the lens and the optical axis) of the object side surface of the latter lens (which is the second lens L2 in the embodiment) on the optical axis. Here, the default is that the direction from the object side surface of the first lens L1 to the image side surface of the last lens is the positive direction of the optical axis. When the value of the "thickness" is negative, it indicates that the stop STO is arranged on the right side of the vertex of the object side surface of the lens (or understood as "on the image side of the vertex"). When the value of the "thickness" of the stop STO is positive, the stop STO is on the left side of the vertex of the object side surface of the lens (or understood as "on the object side of the vertex").

In the embodiment of the present disclosure, the optical axes of the lenses are on the same straight line. The straight line is used as the optical axis of the optical system 10. The value of the "thickness" parameter indicated by the surface number 9 is a distance from the image side surface S8 of the fourth lens L4 to the object side surface S9 of the infrared cut-off filter L5 on the optical axis. The value of the "thickness" parameter corresponding to the surface number 11 for the infrared cut filter L5 is a distance from the image side surface S10 of the infrared cut-off filter L5 to the image surface (the imaging surface S11) of the optical system 10 on the optical axis.

In the first embodiment, the effective focal length of the optical system 10 is indicated by f, and f=4.140 mm. The f-number is indicated by FNO, and FNO=3.0. The maximum angle of field of view (diagonal angle of field of view) is indicated by FOV, and FOV=40.1°. The total optical length is indicated by TTL, and TTL=5.208 mm. TTL is a distance from the object side surface S1 of the first lens L1 to the imaging surface S11 of the optical system 10 on the optical axis.

In addition, in the following embodiments (the first embodiment, a second embodiment, a third embodiment, fourth embodiment, a fifth embodiment, and a sixth embodiment), the refractive index, the abbe number, and the focal lengths are values at a wavelength of 555 nm. In addition, the calculation of the conditions and the surface shapes of the lenses in each embodiment are based on the parameters of the lenses (such as parameters in Table 1, Table 2, Table 3, Table 4, etc.).

TABLE 1

First Embodiment
f = 4.140 mm, FNO = 3.0, FOV = 40.1°, TTL = 5.208 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 30.000 | | | | |
| 1 | First Lens | Aspherical | 1.354 | 0.630 | Plastic | 1.535 | 55.79 | 2.073 |
| 2 | | Aspherical | −5.223 | 0.049 | | | | |
| 3 | Stop | Spherical | Infinite | 0.051 | | | | |
| 4 | Second Lens | Aspherical | −16.840 | 0.560 | Plastic | 1.623 | 23.88 | −3.209 |
| 5 | | Aspherical | 2.316 | 0.420 | | | | |
| 6 | Third Lens | Aspherical | −2.446 | 0.750 | Plastic | 1.660 | 20.40 | 99.830 |
| 7 | | Aspherical | −2.648 | 0.965 | | | | |
| 8 | Fourth Lens | Aspherical | 11.608 | 0.472 | Plastic | 1.535 | 55.79 | −7.504 |
| 9 | | Aspherical | 2.948 | 0.327 | | | | |
| 10 | Infrared Cut- | Spherical | Infinite | 0.210 | Glass | 1.517 | 64.17 | |
| 11 | off Filter | Spherical | Infinite | 0.774 | | | | |
| 12 | Imaging Surface | Spherical | Infinite | 0.000 | | | | |

Note:
the reference wavelength is 555 nm

TABLE 2

First Embodiment
Aspheric Coefficient

| Surface Number | 1 | 2 | 4 | 5 |
|---|---|---|---|---|
| K   | −2.1553E−01 | −7.4665E+01 |  5.0000E+01 |  1.6258E+00 |
| A4  |  1.1723E−02 |  4.4764E−03 |  2.7660E−02 | −1.3186E−02 |
| A6  | −2.2524E−02 |  4.9837E−02 |  1.1942E−01 |  1.4846E−01 |
| A8  |  2.4223E−01 | −1.3085E−01 | −1.4685E+00 | −6.1903E−01 |
| A10 | −1.1152E+00 |  2.1612E−01 |  9.6110E+00 |  4.4261E+00 |
| A12 |  3.0875E+00 | −1.4531E−01 | −3.8122E+01 | −1.7848E+01 |
| A14 | −5.1623E+00 | −1.9232E−01 |  9.3491E+01 |  4.5231E+01 |
| A16 |  5.0959E+00 |  4.2139E−01 | −1.3841E+02 | −6.6607E+01 |
| A18 | −2.7157E+00 | −2.4166E−01 |  1.1329E+02 |  5.1613E+01 |
| A20 |  5.9430E−01 |  1.7690E−02 | −3.9355E+01 | −1.4274E+01 |

| Surface Number | 6 | 7 | 8 | 9 |
|---|---|---|---|---|
| K   | −6.1845E+01 | −1.1902E+01 |  2.9339E+01 |  2.2334E+00 |
| A4  | −5.9638E−01 | −9.4555E−02 | −2.1665E−01 | −2.2465E−01 |
| A6  |  2.3812E+00 |  3.9211E−02 |  5.1014E−02 |  5.8936E−02 |
| A8  | −1.0897E+01 |  3.0440E−01 |  5.2205E−02 |  3.8507E−02 |
| A10 |  4.1364E+01 | −1.3177E+00 | −1.9521E−01 | −1.1276E−01 |
| A12 | −1.1516E+02 |  3.1054E+00 |  3.8941E−01 |  1.2037E−01 |
| A14 |  2.2083E+02 | −4.4152E+00 | −5.1216E−01 | −7.8300E−02 |
| A16 | −2.7294E+02 |  3.7260E+00 |  3.9908E−01 |  3.1316E−02 |
| A18 |  1.9483E+02 | −1.7056E+00 | −1.6642E−01 | −7.0491E−03 |
| A20 | −6.0283E+01 |  3.2336E−01 |  2.8385E−02 |  6.7400E−04 |

Second Embodiment

Figure 3:
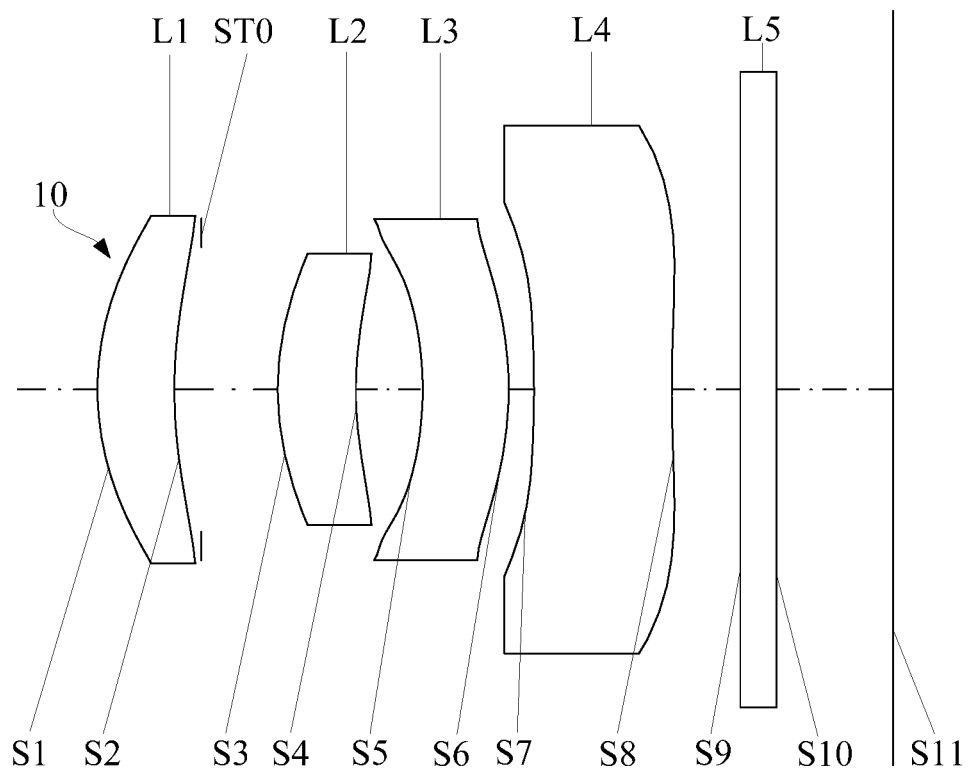
FIG. 3 is a schematic view of an optical system according to a second embodiment of the present disclosure.
Figure 4:
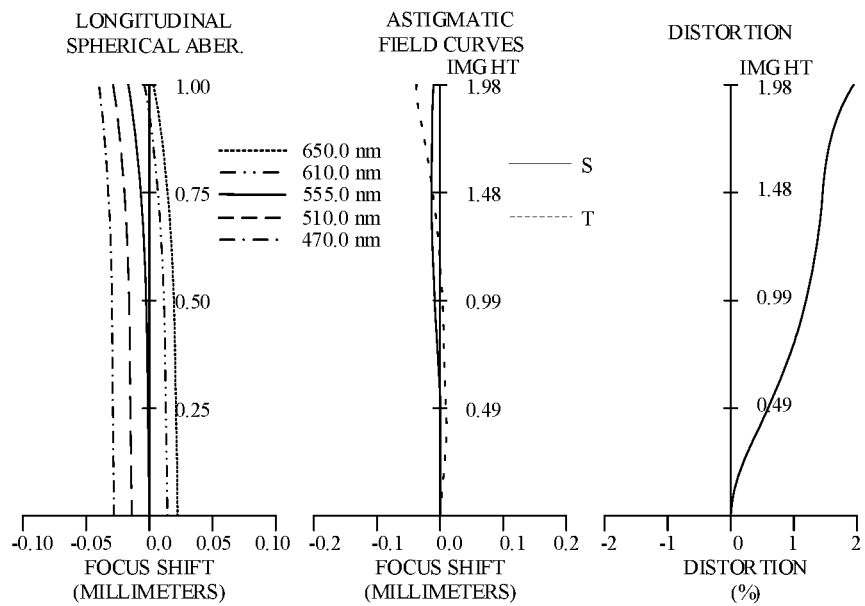
FIG. 4 is a graph showing spherical aberration (mm), astigmatism (mm), and distortion (%) of the optical system according to the second embodiment.

Referring to FIGS. 3 and 4, in the second embodiment, the optical system 10 includes, successively in order from an object side to an image side, a first lens L1 having a positive refractive power, a stop STO, a second lens L2 having a positive refractive power, a third lens L3 having a positive refractive power, and a fourth lens L4 having a negative refractive power. A spherical aberration diagram (mm), an astigmatism diagram (mm), and a distortion diagram (%) of the optical system 10 in the second embodiment is included in FIG. 4. The astigmatism diagram and the distortion diagram are data diagrams at a wavelength of 555 nm.

An object side surface S1 of the first lens L1 is convex at the optical axis and is convex at its circumference. An image side surface S2 of the first lens L1 is concave at the optical axis and is concave at its circumference.

An object side surface S3 of the second lens L2 is convex at the optical axis and is convex at its circumference. An image side surface S4 of the second lens L2 is concave at the optical axis and is concave at its circumference.

An object side surface S5 of the third lens L3 is concave at the optical axis and is concave at its circumference. An image side surface S6 of the third lens L3 is convex at the optical axis and is convex at its circumference.

An object side surface S7 of the fourth lens L4 is concave at the optical axis and is concave at its circumference. An image side surface S8 of the fourth lens L4 is concave at the optical axis and is convex at its circumference. The image side surface S8 of the fourth lens L4 has an inflection point.

The first lens L1, the second lens L2, the third lens L3, and the object side surface S7 and the image side surface S8 of the fourth lens L4 are all aspherical. By matching the aspheric surface shapes of the lenses in the optical system 10, the problem of distortion of the field of view of the optical system 10 can be effectively solved, and the lens can achieve excellent optical effects even when the lenses are small and thin. As such, the optical system 10 has a smaller volume, which is beneficial to the miniaturized design of the optical system 10.

The first lens L1, the second lens L2, the third lens L3, and the fourth lens L4 are all made of plastic. The adoption of the lenses made of plastic can reduce the manufacturing cost of the optical system 10 while reducing the weight of the optical system 10.

It can be seen from FIG. 3 that an infrared cut-off filter L5 is further arranged on an image side of the fourth lens L4 for filtering infrared light. In some embodiments, the infrared cut-off filter L5 is a part of the optical system 10. For example, the infrared cut-off filter L5 is assembled on a lens barrel together with the lenses. In other embodiments, the infrared cut-off filter L5 is mounted between the optical system 10 and a photosensitive element when the optical system 10 and the photosensitive element are assembled into a camera module.

In the second embodiment, the effective focal length of the optical system 10 is indicated by f, and f=3.968 mm. The f-number is indicated by FNO, and FNO=2.45. The maximum angle of field of view (diagonal angle of field of view) is indicated by FOV, and FOV=50.1°. The total optical length is indicated by TTL, and TTL=4.62 mm.

In addition, various parameters of the lenses of the optical system 100 are shown in Table 3 and Table 4. Definitions of the various parameters can be obtained from the first embodiment, and which will not be repeated herein.

TABLE 3

Second Embodiment
f = 3.968 mm, FNO = 2.45, FOV = 50.1°, TTL = 4.62 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 26.000 | | | | |
| 1 | First Lens | Aspherical | 1.383 | 0.447 | Plastic | 1.545 | 55.93 | 5.002 |
| 2 | | Aspherical | 2.481 | 0.157 | | | | |
| 3 | Stop | Spherical | Infinite | 0.442 | | | | |
| 4 | Second Lens | Aspherical | 1.412 | 0.456 | Plastic | 1.545 | 55.93 | 6.544 |
| 5 | | Aspherical | 2.068 | 0.387 | | | | |
| 6 | Third Lens | Aspherical | −1.668 | 0.500 | Plastic | 1.661 | 20.37 | 14.731 |
| 7 | | Aspherical | −1.597 | 0.147 | | | | |
| 8 | Fourth Lens | Aspherical | −6.035 | 0.800 | Plastic | 1.661 | 20.37 | −4.562 |
| 9 | | Aspherical | 6.453 | 0.398 | | | | |
| 10 | Infrared Cut-off Filter | Spherical | Infinite | 0.210 | Glass | 1.517 | 64.17 | |
| 11 | | Spherical | Infinite | 0.677 | | | | |
| 12 | Imaging Surface | Spherical | Infinite | 0.000 | | | | |

Note:
the reference wavelength is 555 nm

TABLE 4

Second Embodiment
Aspheric Coefficient

| Surface Number | 1 | 2 | 4 | 5 |
|---|---|---|---|---|
| K | −1.5307E−01 | −2.2723E+01 | −8.0997E−03 | 1.5170E+00 |
| A4 | −1.4018E−02 | 1.3727E−01 | −4.6267E−02 | −2.3719E−02 |
| A6 | −3.5799E−02 | −3.4528E−01 | −9.0936E−02 | −4.1310E−01 |
| A8 | 1.0479E−01 | 7.0004E−01 | 1.0025E−01 | 1.3294E+00 |
| A10 | −3.2744E−01 | −1.4560E+00 | −2.1350E−01 | −6.0329E+00 |
| A12 | 4.9147E−01 | 2.1266E+00 | 1.2300E−01 | 1.4251E+01 |
| A14 | −3.9766E−01 | −1.8244E+00 | 8.3382E−02 | −1.8908E+01 |
| A16 | 1.2544E−01 | 6.6974E−01 | 9.5350E−02 | 1.1563E+01 |
| A18 | 0.0000E+00 | 0.0000E+00 | 0.0000E+00 | 0.0000E+00 |
| A20 | 0.0000E+00 | 0.0000E+00 | 0.0000E+00 | 0.0000E+00 |

| Surface Number | 6 | 7 | 8 | 9 |
|---|---|---|---|---|
| K | −1.7672E+01 | −1.9905E+01 | 1.9191E+01 | −5.5827E+01 |
| A4 | −3.7718E−01 | −2.4526E−01 | 1.3802E−01 | −4.3106E−02 |
| A6 | 3.5412E−01 | 2.3970E−01 | −1.2987E+00 | −1.8880E−01 |
| A8 | −3.1053E−01 | −2.6905E−01 | 3.7427E+00 | 4.0344E−01 |
| A10 | −2.7492E+00 | 1.2753E+00 | −6.8366E+00 | −4.9829E−01 |
| A12 | 1.1327E+01 | −3.7050E+00 | 8.0668E+00 | 3.9668E−01 |
| A14 | −2.5121E+01 | 5.5465E+00 | −5.9647E+00 | −2.0691E−01 |
| A16 | 3.0330E+01 | −3.7426E+00 | 2.6618E+00 | 6.8774E−02 |
| A18 | −1.0661E+01 | 9.0350E−01 | −6.5602E−01 | −1.3336E−02 |
| A20 | −3.7442E+00 | −2.3897E−02 | 6.8640E−02 | 1.1563E−03 |

From the above data, the following data can be obtained.

| Second Embodiment | | | |
|---|---|---|---|
| OBL (mm) | 26 | f1/f2 | 0.764 |
| SL/TTL | 0.869 | CT3/CT2 | 1.096 |
| DT11/DT42 | 0.658 | R1/R9 | 0.214 |
| SAG31/CT3 | −0.396 | (f2 + f4)/f | 0.498 |
| |SAG41|/CT4 | 0.218 | TTL/ImgH | 2.33 |

Third Embodiment

Figure 5:
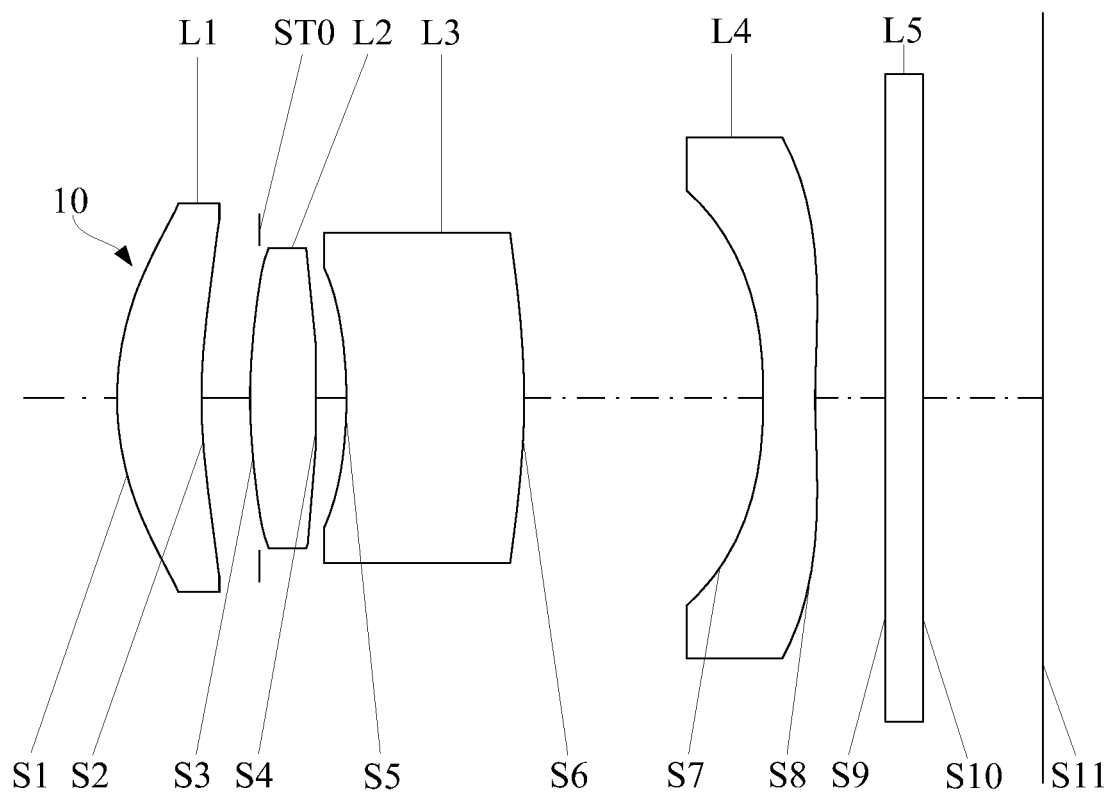
FIG. 5 is a schematic view of an optical system according to a third embodiment of the present disclosure.
Figure 6:
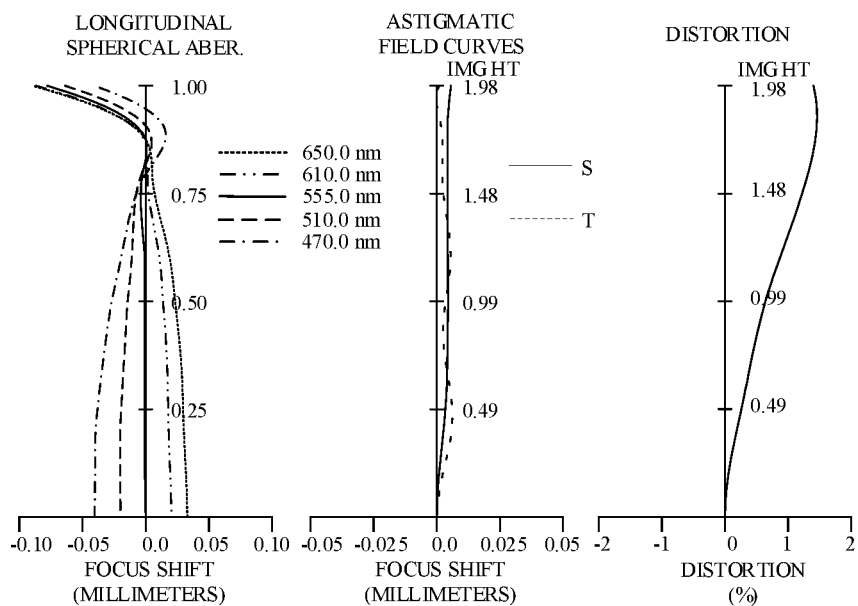
FIG. 6 is a graph showing spherical aberration (mm), astigmatism (mm), and distortion (%) of the optical system according to the third embodiment.

Referring to FIGS. 5 and 6, in the third embodiment, the optical system 10 includes, successively in order from an object side to an image side, a first lens L1 having a positive refractive power, a stop STO, a second lens L2 having a positive refractive power, a third lens L3 having a negative refractive power, and a fourth lens L4 having a negative refractive power. A spherical aberration diagram (mm), an astigmatism diagram (mm), and a distortion diagram (%) of the optical system 10 in the third embodiment is included in FIG. 6. The astigmatism diagram and the distortion diagram are data diagrams at a wavelength of 555 nm.

An object side surface S1 of the first lens L1 is convex at the optical axis and is convex at its circumference. An image side surface S2 of the first lens L1 is concave at the optical axis and is concave at its circumference.

An object side surface S3 of the second lens L2 is convex at the optical axis and is convex at its circumference. An image side surface S4 of the second lens L2 is concave at the optical axis and is convex at its circumference.

An object side surface S5 of the third lens L3 is concave at the optical axis and is concave at its circumference. An image side surface S6 of the third lens L3 is convex at the optical axis and is convex at its circumference.

An object side surface S7 of the fourth lens L4 is concave at the optical axis and is concave at its circumference. An image side surface S8 of the fourth lens L4 is concave at the optical axis and is convex at its circumference. The image side surface S8 of the fourth lens L4 has an inflection point.

The first lens L1, the second lens L2, the third lens L3, and the object side surface S7 and the image side surface S8 of the fourth lens L4 are all aspherical. By matching the aspheric surface shapes of the lenses in the optical system 10, the problem of distortion of the field of view of the optical system 10 can be effectively solved, and the lens can achieve excellent optical effects even when the lenses are small and thin. As such, the optical system 10 has a smaller volume, which is beneficial to the miniaturized design of the optical system 10.

The first lens L1, the second lens L2, the third lens L3, and the fourth lens L4 are all made of plastic. The adoption of the lenses made of plastic can reduce the manufacturing cost of the optical system 10 while reducing the weight of the optical system 10.

It can be seen from FIG. 5 that, an infrared cut-off filter L5 is further arranged on an image side of the fourth lens L4 for filtering infrared light. In some embodiments, the infrared cut-off filter L5 is a part of the optical system 10. For example, the infrared cut-off filter L5 is assembled on a lens barrel together with the lenses. In other embodiments, the infrared cut-off filter L5 is mounted between the optical system 10 and a photosensitive element when the optical system 10 and the photosensitive element are assembled into a camera module.

In the third embodiment, the effective focal length of the optical system 10 is indicated by f, and f=4.08 mm. The f-number is indicated by FNO, and FNO=3.1. The maximum angle of field of view (diagonal angle of field of view) is indicated by FOV, and FOV=38.7°. The total optical length is indicated by TTL, and TTL=5.21 mm.

In addition, various parameters of the lenses of the optical system 100 are shown in Table 5 and Table 6. Definitions of the various parameters can be obtained from the first embodiment, and which will not be repeated herein.

TABLE 5

Third Embodiment
f = 4.08 mm, FNO = 3.1, FOV = 38.7°, TTL = 5.21 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 30.000 | | | | |
| 1 | First Lens | Aspherical | 1.391 | 0.476 | Plastic | 1.535 | 55.79 | 4.612 |
| 2 | | Aspherical | 2.796 | 0.324 | | | | |
| 3 | Stop | Spherical | Infinite | −0.052 | | | | |
| 4 | Second Lens | Aspherical | 2.676 | 0.371 | Plastic | 1.535 | 55.79 | 5.462 |
| 5 | | Aspherical | 29.164 | 0.171 | | | | |
| 6 | Third Lens | Aspherical | −2.494 | 1.000 | Plastic | 1.660 | 20.40 | −15.917 |
| 7 | | Aspherical | −3.784 | 1.345 | | | | |
| 8 | Fourth Lens | Aspherical | −3.117 | 0.293 | Plastic | 1.535 | 55.79 | −3.387 |
| 9 | | Aspherical | 4.505 | 0.396 | | | | |
| 10 | Infrared Cut- | Spherical | Infinite | 0.210 | Glass | 1.517 | 64.17 | |
| 11 | off Filter | Spherical | Infinite | 0.676 | | | | |
| 12 | Imaging Surface | Spherical | Infinite | 0.000 | | | | |

Note:
the reference wavelength is 555 nm

TABLE 6

Third Embodiment
Aspheric Coefficient

| Surface Number | 1 | 2 | 4 | 5 |
|---|---|---|---|---|
| K | −2.0736E−01 | −2.9445E+01 | 9.0681E−01 | 2.0000E+01 |
| A4 | −1.7393E−02 | 8.0526E−02 | −1.4262E−01 | −2.5185E−01 |
| A6 | 5.4547E−02 | −2.8029E−01 | −1.5434E−01 | 2.1912E−01 |
| A8 | −5.7391E−01 | 5.4877E−01 | 3.0096E+00 | −9.4371E−01 |
| A10 | 2.5840E+00 | −8.8357E−01 | −1.9574E+01 | 6.2299E+00 |
| A12 | −7.1555E+00 | 4.2356E−01 | 7.8562E+01 | −2.4094E+01 |
| A14 | 1.1867E+01 | 1.5578E+00 | −1.9017E+02 | 6.1886E+01 |
| A16 | −1.1691E+01 | −3.1193E+00 | 2.7502E+02 | −1.0232E+02 |
| A18 | 6.3088E+00 | 2.3193E+00 | −2.1682E+02 | 1.0197E+02 |
| A20 | −1.4383E+00 | −6.4375E−01 | 7.1031E+01 | −5.0209E+01 |

| Surface Number | 6 | 7 | 8 | 9 |
|---|---|---|---|---|
| K | −1.9841E+01 | −4.8624E+01 | 3.4671E+00 | 2.3862E+00 |
| A4 | −3.2810E−01 | −9.2353E−02 | −3.5029E−01 | −3.4269E−01 |
| A6 | 2.8504E−01 | 2.0778E−01 | 4.3521E−01 | 3.8992E−01 |
| A8 | −9.0811E−02 | −2.7686E−01 | −4.8659E−01 | −3.7595E−01 |
| A10 | −7.9336E+00 | 1.2235E−01 | 3.2970E−01 | 2.4867E−01 |
| A12 | 7.2468E+01 | 7.3790E−01 | 2.4675E−01 | −9.8564E−02 |
| A14 | −3.2721E+02 | −2.2965E+00 | −2.8329E−01 | 1.4718E−02 |
| A16 | 8.0990E+02 | 3.1429E+00 | 2.2693E−01 | 3.5562E−03 |
| A18 | −1.0500E+03 | −2.1619E+00 | −7.3963E−02 | −1.6112E−03 |
| A20 | 5.5303E+02 | 5.9805E−01 | 8.8365E−03 | 1.6551E−04 |

From the above data, the following data can be obtained.

| Third Embodiment | | | |
|---|---|---|---|
| OBL (mm) | 30 | f1/f2 | 0.844 |
| SL/TTL | 0.846 | CT3/CT2 | 2.695 |
| DT11/DT42 | 0.745 | R1/R9 | 0.309 |
| SAG31/CT3 | −0.128 | (f2 + f4)/f | 0.509 |
| |SAG41|/CT4 | 1.468 | TTL/ImgH | 2.63 |

Fourth Embodiment

Figure 7:
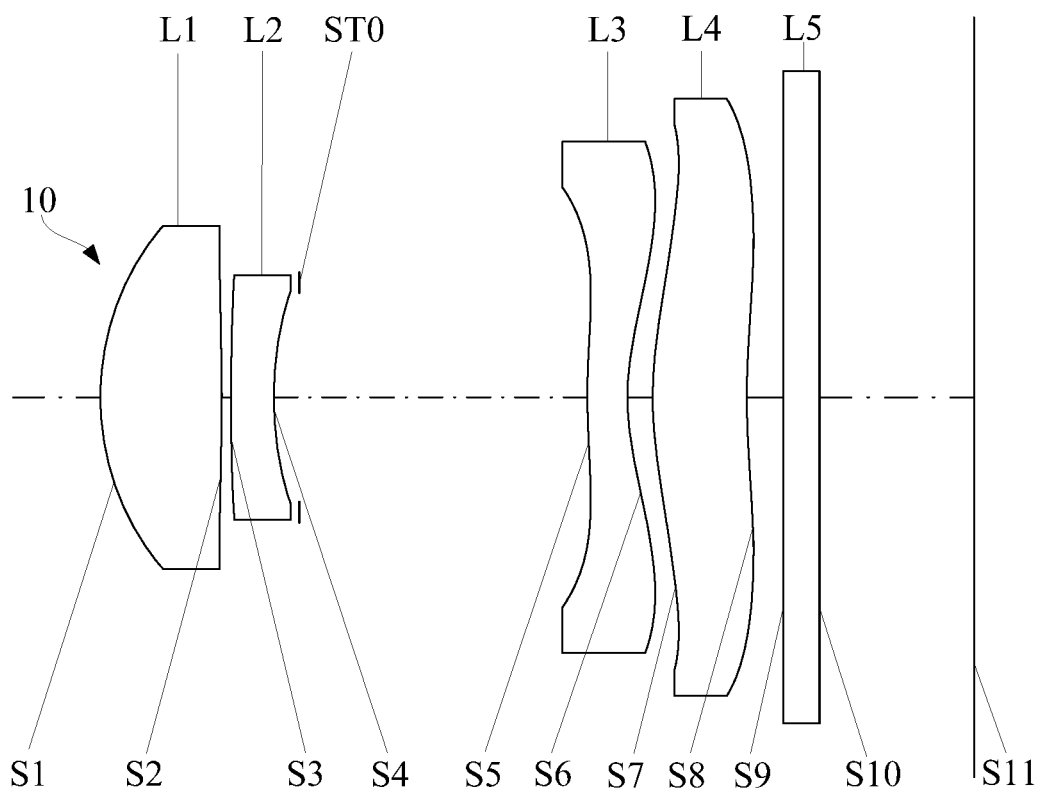
FIG. 7 is a schematic view of an optical system according to a fourth embodiment of the present disclosure.
Figure 8:
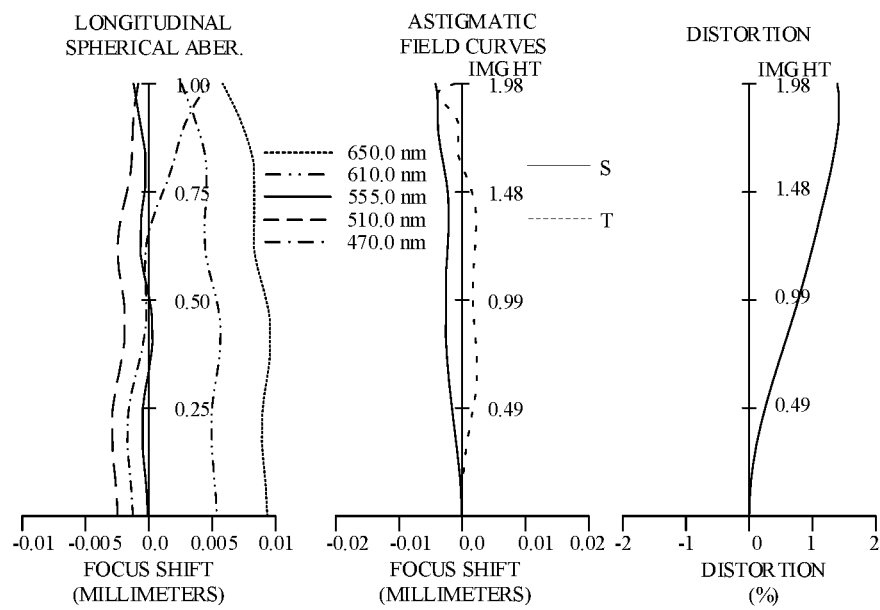
FIG. 8 is a graph showing spherical aberration (mm), astigmatism (mm), and distortion (%) of the optical system according to the fourth embodiment.

Referring to FIGS. 7 and 8, in the fourth embodiment, the optical system 10 includes, successively in order from an object side to an image side, a first lens L1 having a positive refractive power, a second lens L2 having a negative refractive power, a stop STO, a third lens L3 having a negative refractive power, and a fourth lens L4 having a positive refractive power. A spherical aberration diagram (mm), an astigmatism diagram (mm), and a distortion diagram (%) of the optical system 10 in the fourth embodiment is included in FIG. 8. The astigmatism diagram and the distortion diagram are data diagrams at a wavelength of 555 nm.

An object side surface S1 of the first lens L1 is convex at the optical axis and is convex at its circumference. An image side surface S2 of the first lens L1 is convex at the optical axis and is convex at its circumference.

An object side surface S3 of the second lens L2 is convex at the optical axis and is convex at its circumference. An image side surface S4 of the second lens L2 is concave at the optical axis and is concave at its circumference.

An object side surface S5 of the third lens L3 is convex at the optical axis and is concave at its circumference. An image side surface S6 of the third lens L3 is concave at the optical axis and is convex at its circumference.

An object side surface S7 of the fourth lens L4 is convex at the optical axis and is concave at its circumference. An image side surface S8 of the fourth lens L4 is concave at the optical axis and is convex at its circumference. The image side surface S8 of the fourth lens L4 has an inflection point.

The first lens L1, the second lens L2, the third lens L3, and the object side surface S7 and the image side surface S8 of the fourth lens L4 are all aspherical. By matching the aspheric surface shapes of the lenses in the optical system 10, the problem of distortion of the field of view of the optical system 10 can be effectively solved, and the lens can achieve excellent optical effects even when the lenses are small and thin. As such, the optical system 10 has a smaller volume, which is beneficial to the miniaturized design of the optical system 10.

The first lens L1, the second lens L2, the third lens L3, and the fourth lens L4 are all made of plastic. The adoption of the lenses made of plastic can reduce the manufacturing cost of the optical system 10 while reducing the weight of the optical system 10.

It can be seen from FIG. 7 that, an infrared cut-off filter L5 is further arranged on an image side of the fourth lens L4 for filtering infrared light. In some embodiments, the infrared cut-off filter L5 is a part of the optical system 10. For example, the infrared cut-off filter L5 is assembled on a lens barrel together with the lenses. In other embodiments, the infrared cut-off filter L5 is mounted between the optical system 10 and a photosensitive element when the optical system 10 and the photosensitive element are assembled into a camera module.

In the fourth embodiment, the effective focal length of the optical system 10 is indicated by f, and f=4.23 mm. The f-number is indicated by FNO, and FNO=3.55. The maximum angle of field of view (diagonal angle of field of view) is indicated by FOV, and FOV=38.2°. The total optical length is indicated by TTL, and TTL=5.029 mm.

In addition, various parameters of the lenses of the optical system 100 are shown in Table 7 and Table 8. Definitions of the various parameters can be obtained from the first embodiment, and which will not be repeated herein.

TABLE 7

Fourth Embodiment
f = 4.23 mm, FNO = 3.55, FOV = 38.2°, TTL = 5.029 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 30.000 | | | | |
| 1 | | Aspherical | 1.284 | 0.699 | | | | |
| 2 | First Lens | Aspherical | −10.556 | 0.054 | Plastic | 1.545 | 55.93 | 2.142 |
| 3 | Second Lens | Aspherical | 16.821 | 0.247 | Plastic | 1.639 | 23.26 | −3.173 |
| 4 | | Aspherical | 1.813 | 0.146 | | | | |
| 3 | Stop | Spherical | Infinite | 1.658 | | | | |
| 6 | Third Lens | Aspherical | 3.299 | 0.230 | Plastic | 1.545 | 55.93 | −3.499 |
| 7 | | Aspherical | 1.180 | 0.145 | | | | |
| 8 | Fourth Lens | Aspherical | 1.823 | 0.542 | Plastic | 1.639 | 23.26 | 4.911 |
| 9 | | Aspherical | 3.797 | 0.209 | | | | |
| 10 | Infrared Cut- | Spherical | Infinite | 0.210 | Glass | 1.517 | 64.17 | |
| 11 | off Filter | Spherical | Infinite | 0.890 | | | | |
| 12 | Imaging Surface | Spherical | Infinite | 0.000 | | | | |

Note:
the reference wavelength is 555 nm

TABLE 8

Fourth Embodiment
Aspheric Coefficient

| Surface Number | 1 | 2 | 3 | 4 |
|---|---|---|---|---|
| K | −1.0492E−01 | −9.9000E+01 | −9.9000E+01 | −1.0711E+00 |
| A4 | 3.8357E−03 | 5.5668E−02 | 5.1581E−02 | 9.6296E−02 |
| A6 | 1.2901E−03 | −1.7328E−01 | −1.6248E−01 | 1.4937E−01 |
| A8 | 1.2509E−02 | 9.0502E−01 | 1.0019E+00 | −1.0237E+00 |
| A10 | −3.2833E−02 | −2.5783E+00 | −2.8590E+00 | 9.1206E+00 |
| A12 | 7.2108E−02 | 3.9889E+00 | 3.9047E+00 | −3.7787E+01 |
| A14 | −7.1429E−02 | −3.2906E+00 | −2.4051E+00 | 7.6613E+01 |
| A16 | 2.4734E−02 | 1.1483E+00 | 4.8501E−01 | −6.0388E+01 |
| A18 | 0.0000E+00 | 0.0000E+00 | 0.0000E+00 | 0.0000E+00 |
| A20 | 0.0000E+00 | 0.0000E+00 | 0.0000E+00 | 0.0000E+00 |

| Surface Number | 6 | 7 | 8 | 9 |
|---|---|---|---|---|
| K | −8.9861E+00 | −8.8376E+00 | −1.5555E+01 | −3.9440E+01 |
| A4 | −3.7306E−01 | −9.9064E−02 | −2.8212E−02 | −6.7070E−02 |
| A6 | 5.9428E−01 | 8.2010E−02 | −3.0477E−02 | 7.9208E−03 |
| A8 | −1.2251E+00 | −1.7516E−01 | 3.4848E−02 | −6.0722E−03 |
| A10 | 1.7498E+00 | 2.5224E−01 | 1.4330E−02 | 1.6473E−02 |
| A12 | −1.6113E+00 | −2.1006E−01 | −3.5944E−02 | −1.1270E−02 |
| A14 | 8.3231E−01 | 8.7574E−02 | 1.6689E−02 | 2.8515E−03 |
| A16 | −1.7983E−01 | −1.4105E−02 | −2.4740E−03 | −2.4376E−04 |
| A18 | 0.0000E+00 | 0.0000E+00 | 0.0000E+00 | 0.0000E+00 |
| A20 | 0.0000E+00 | 0.0000E+00 | 0.0000E+00 | 0.0000E+00 |

From the above data, the following data can be obtained.

| Fourth Embodiment | | | |
|---|---|---|---|
| OBL (mm) | 30 | f1/f2 | −0.675 |
| SL/TTL | 0.772 | CT3/CT2 | 0.931 |
| DT11/DT42 | 0.575 | R1/R9 | 0.338 |
| SAG31/CT3 | −0.626 | (f2 + f4)/f | 0.411 |
| |SAG41|/CT4 | 0.231 | TTL/ImgH | 2.54 |

Fifth Embodiment

Figure 9:
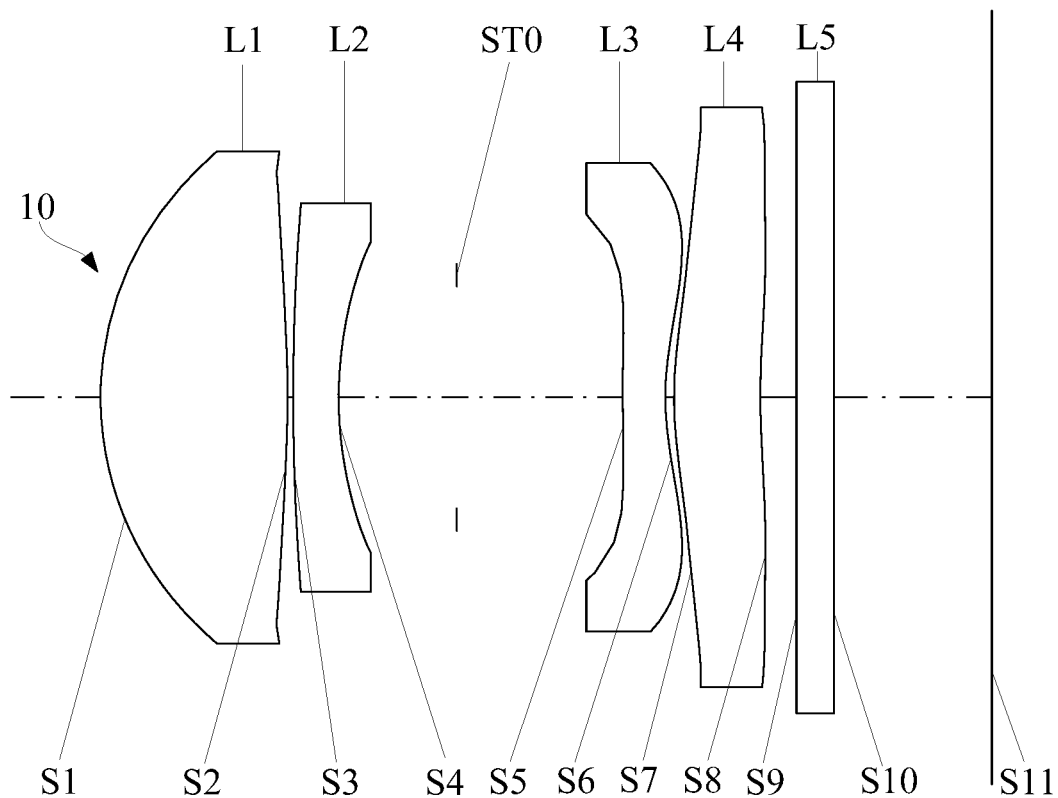
FIG. 9 is a schematic view of an optical system according to a fifth embodiment of the present disclosure.
Figure 10:
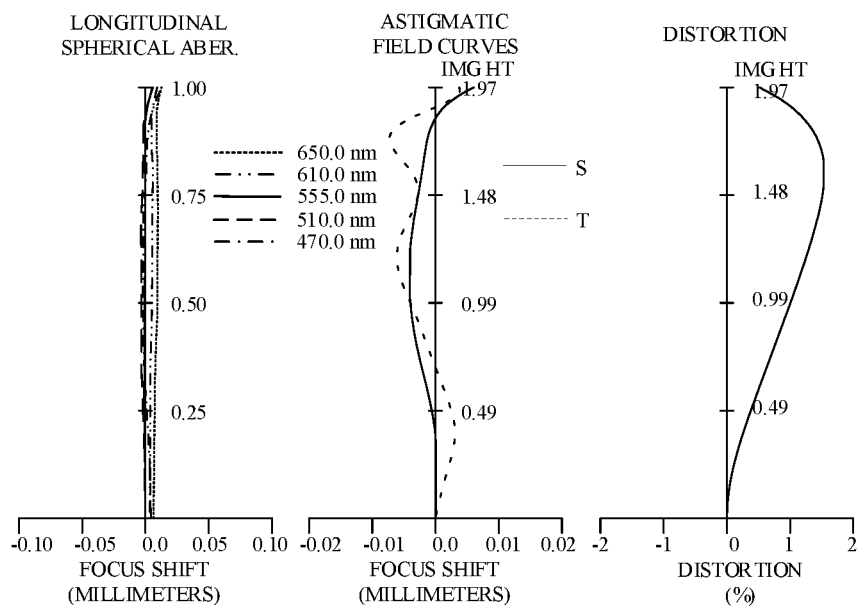
FIG. 10 is a graph showing spherical aberration (mm), astigmatism (mm), and distortion (%) of the optical system according to the fifth embodiment.

Referring to FIGS. 9 and 10, in the fifth embodiment, the optical system 10 includes, successively in order from an object side to an image side, a first lens L1 having a positive refractive power, a second lens L2 having a negative refractive power, a stop STO, a third lens L3 having a negative refractive power, and a fourth lens L4 having a positive refractive power. A spherical aberration diagram (mm), an astigmatism diagram (mm), and a distortion diagram (%) of the optical system 10 in the fifth embodiment is included in FIG. 10. The astigmatism diagram and the distortion diagram are data diagrams at a wavelength of 555 nm.

An object side surface S1 of the first lens L1 is convex at the optical axis and is convex at its circumference. An image side surface S2 of the first lens L1 is convex at the optical axis and is convex at its circumference.

An object side surface S3 of the second lens L2 is convex at the optical axis and is convex at its circumference. An image side surface S4 of the second lens L2 is concave at the optical axis and is concave at its circumference.

An object side surface S5 of the third lens L3 is convex at the optical axis and is concave at its circumference. An image side surface S6 of the third lens L3 is concave at the optical axis and is convex at its circumference.

An object side surface S7 of the fourth lens L4 is convex at the optical axis and is convex at its circumference. An image side surface S8 of the fourth lens L4 is concave at the optical axis and is convex at its circumference. The image side surface S8 of the fourth lens L4 has an inflection point.

The first lens L1, the second lens L2, the third lens L3, and the object side surface S7 and the image side surface S8 of the fourth lens L4 are all aspherical. By matching the aspheric surface shapes of the lenses in the optical system 10, the problem of distortion of the field of view of the optical system 10 can be effectively solved, and the lens can achieve excellent optical effects even when the lenses are small and thin. As such, the optical system 10 has a smaller volume, which is beneficial to the miniaturized design of the optical system 10.

The first lens L1, the second lens L2, the third lens L3, and the fourth lens L4 are all made of plastic. The adoption of the lenses made of plastic can reduce the manufacturing cost of the optical system 10 while reducing the weight of the optical system 10.

It can be seen from FIG. 9 that an infrared cut-off filter L5 is further arranged on an image side of the fourth lens L4 for filtering infrared light. In some embodiments, the infrared cut-off filter L5 is a part of the optical system 10. For example, the infrared cut-off filter L5 is assembled on a lens barrel together with the lenses. In other embodiments, the infrared cut-off filter L5 is mounted between the optical system 10 and a photosensitive element when the optical system 10 and the photosensitive element are assembled into a camera module.

In the fifth embodiment, the effective focal length of the optical system 10 is indicated by f, and f=4.10 mm. The f-number is indicated by FNO, and FNO=2.62. The maximum angle of field of view (diagonal angle of field of view) is indicated by FOV, and FOV=38.4°. The total optical length is indicated by TTL, and TTL=5.00 mm.

In addition, various parameters of the lenses of the optical system 100 are shown in Table 9 and Table 10. Definitions of the various parameters can be obtained from the first embodiment, and which will not be repeated herein.

TABLE 9

Fifth Embodiment
f = 4.10 mm, FNO = 2.62, FOV = 38.4°, TTL = 5.00 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 30.000 | | | | |
| 1 | First Lens | Aspherical | 1.483 | 1.049 | Plastic | 1.545 | 55.93 | 2.219 |
| 2 | | Aspherical | −4.955 | 0.030 | | | | |
| 3 | Second Lens | Aspherical | 8.936 | 0.256 | Plastic | 1.661 | 20.37 | −3.317 |
| 4 | | Aspherical | 1.752 | 0.663 | | | | |
| 3 | Stop | Spherical | Infinite | 0.931 | | | | |
| 6 | Third Lens | Aspherical | 6.868 | 0.240 | Plastic | 1.545 | 55.93 | −3.181 |
| 7 | | Aspherical | 1.369 | 0.048 | | | | |
| 8 | Fourth Lens | Aspherical | 1.816 | 0.485 | Plastic | 1.661 | 20.37 | 4.676 |
| 9 | | Aspherical | 3.885 | 0.203 | | | | |
| 10 | Infrared Cut- | Spherical | Infinite | 0.210 | Glass | 1.517 | 64.17 | |
| 11 | off Filter | Spherical | Infinite | 0.885 | | | | |
| 12 | Imaging Surface | Spherical | Infinite | 0.000 | | | | |

Note:
the reference wavelength is 555 nm

TABLE 10

Fifth Embodiment
Aspheric Coefficient

| Surface Number | 1 | 2 | 3 | 4 |
|---|---|---|---|---|
| K | −1.6240E−01 | −9.4179E+01 | −8.2782E+01 | −4.6154E+00 |
| A4 | 1.2911E−03 | 6.2898E−02 | 1.6409E−02 | −8.9211E−03 |
| A6 | 8.8607E−04 | −2.1311E−01 | −1.9701E−01 | 5.5408E−02 |
| A8 | −2.2018E−03 | 6.0800E−01 | 8.8555E−01 | 1.4475E+00 |
| A10 | 9.2874E−03 | −1.3084E+00 | −2.9924E+00 | −1.2403E+01 |
| A12 | −2.0020E−02 | 2.0479E+00 | 7.2944E+00 | 5.4361E+01 |
| A14 | 2.5407E−02 | −2.2194E+00 | −1.1584E+01 | −1.3780E+02 |
| A16 | −1.8984E−02 | 1.5395E+00 | 1.1164E+01 | 2.0373E+02 |
| A18 | 7.6896E−03 | −6.0636E−01 | −5.8922E+00 | −1.6276E+02 |
| A20 | −1.4028E−03 | 1.0238E−01 | 1.3037E+00 | 5.4327E+01 |

| Surface Number | 6 | 7 | 8 | 9 |
|---|---|---|---|---|
| K | −9.8991E+01 | −6.5833E+00 | −2.1832E+01 | −2.8708E+01 |
| A4 | −2.0072E−01 | −2.5162E−01 | 3.4388E−03 | −1.4045E−01 |
| A6 | −3.7090E−01 | 2.2997E−01 | −4.8409E−01 | 7.2229E−02 |
| A8 | 2.6589E+00 | −5.0633E−01 | 1.3666E+00 | −1.3184E−02 |
| A10 | −1.3519E+01 | 8.5228E−01 | −1.9660E+00 | 4.7984E−02 |
| A12 | 4.1268E+01 | −9.4065E−01 | 1.7497E+00 | −6.4034E−02 |
| A14 | −7.8254E+01 | 5.3556E−01 | −9.9883E−01 | 3.6499E−02 |
| A16 | 8.9515E+01 | −6.2632E−02 | 3.5408E−01 | −1.2213E−02 |
| A18 | −5.6472E+01 | −7.3596E−02 | −7.0280E−02 | 2.7173E−03 |
| A20 | 1.5047E+01 | 2.5040E−02 | 5.8837E−03 | −3.1686E−04 |

From the above data, the following data can be obtained.

| Fifth Embodiment | | | |
|---|---|---|---|
| OBL (mm) | 30 | f1/f2 | −0.669 |
| SL/TTL | 0.6 | CT3/CT2 | 0.938 |
| DT11/DT42 | 0.849 | R1/R9 | 0.381 |
| SAG31/CT3 | −0.85 | (f2 + f4)/f | 0.331 |
| |SAG41|/CT4 | 0.307 | TTL/ImgH | 2.54 |

Sixth Embodiment

Figure 11:
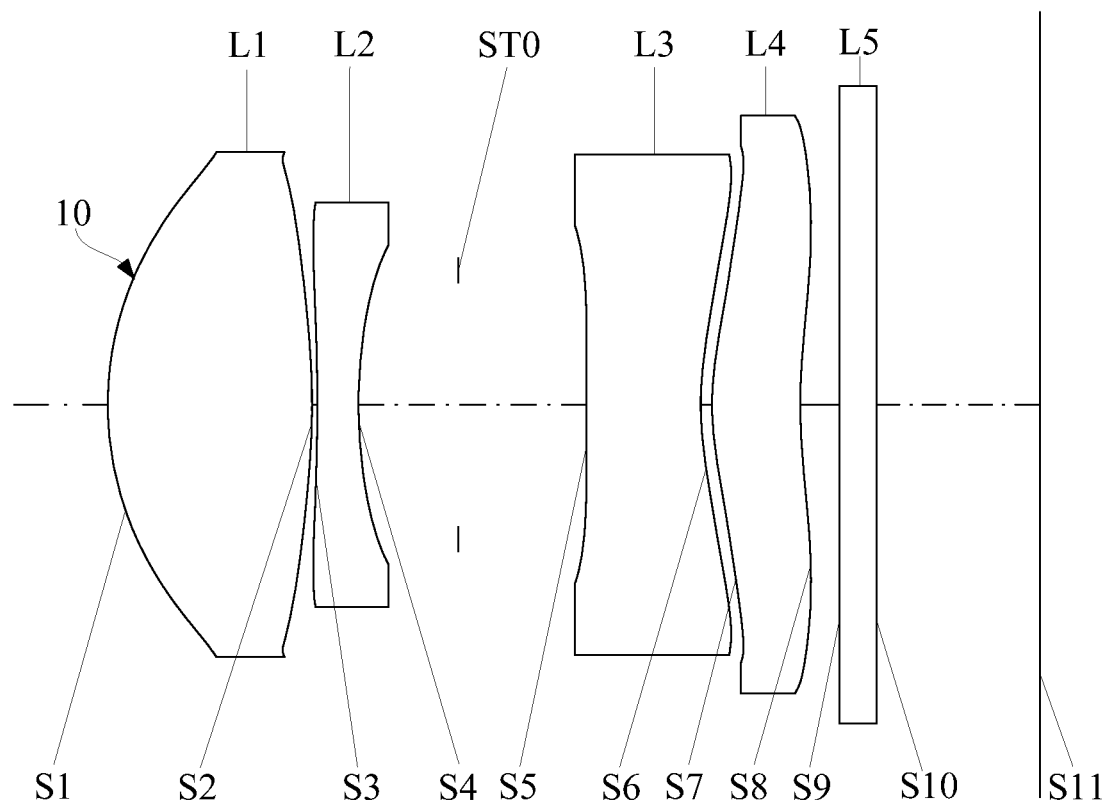
FIG. 11 is a schematic view of an optical system according to a sixth embodiment of the present disclosure.
Figure 12:
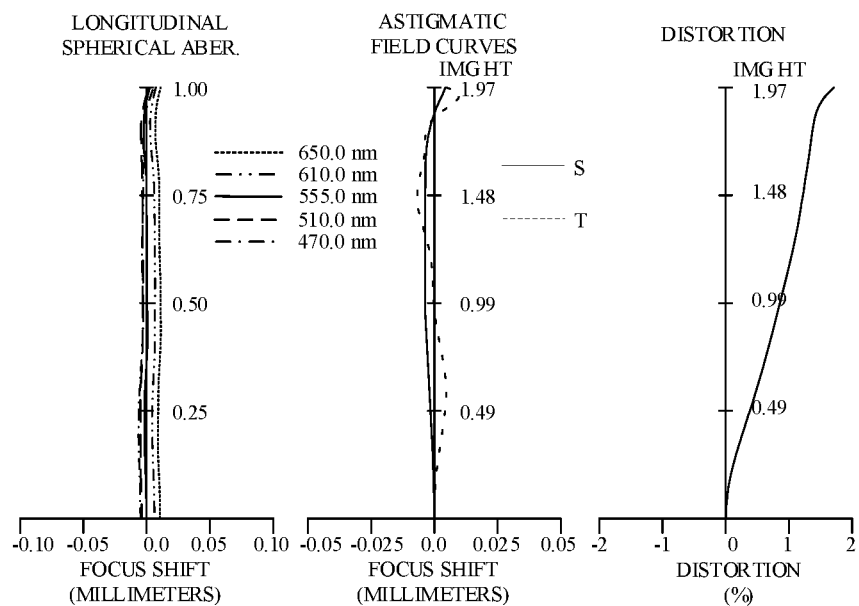
FIG. 12 is a graph showing spherical aberration (mm), astigmatism (mm), and distortion (%) of the optical system according to the sixth embodiment.

Referring to FIGS. 11 and 12, in the sixth embodiment, the optical system 10 includes, successively in order from an object side to an image side, a first lens L1 having a positive refractive power, a second lens L2 having a negative refractive power, a stop STO, a third lens L3 having a negative refractive power, and a fourth lens L4 having a positive refractive power. A spherical aberration diagram (mm), an astigmatism diagram (mm), and a distortion diagram (%) of the optical system 10 in the sixth embodiment is included in FIG. 12. The astigmatism diagram and the distortion diagram are data diagrams at a wavelength of 555 nm.

An object side surface S1 of the first lens L1 is convex at the optical axis and is convex at its circumference. An image side surface S2 of the first lens L1 is convex at the optical axis and is convex at its circumference.

An object side surface S3 of the second lens L2 is concave at the optical axis and is convex at its circumference. An image side surface S4 of the second lens L2 is concave at the optical axis and is concave at its circumference.

An object side surface S5 of the third lens L3 is convex at the optical axis and is concave at its circumference. An image side surface S6 of the third lens L3 is concave at the optical axis and is convex at its circumference.

An object side surface S7 of the fourth lens L4 is convex at the optical axis and is concave at its circumference. An image side surface S8 of the fourth lens L4 is concave at the optical axis and is convex at its circumference. The image side surface S8 of the fourth lens L4 has an inflection point.

The first lens L1, the second lens L2, the third lens L3, and the object side surface S7 and the image side surface S8 of the fourth lens L4 are all aspherical. By matching the aspheric surface shapes of the lenses in the optical system 10, the problem of distortion of the field of view of the optical system 10 can be effectively solved, and the lens can achieve excellent optical effects even when the lenses are small and thin. As such, the optical system 10 has a smaller volume, which is beneficial to the miniaturized design of the optical system 10.

The first lens L1, the second lens L2, the third lens L3, and the fourth lens L4 are all made of plastic. The adoption of the lenses made of plastic can reduce the manufacturing cost of the optical system 10 while reducing the weight of the optical system 10.

It can be seen from FIG. 11 that, an infrared cut-off filter L5 is further arranged on an image side of the fourth lens L4 for filtering infrared light. In some embodiments, the infrared cut-off filter L5 is a part of the optical system 10. For example, the infrared cut-off filter L5 is assembled on a lens barrel together with the lenses. In other embodiments, the infrared cut-off filter L5 is mounted between the optical system 10 and a photosensitive element when the optical system 10 and the photosensitive element are assembled into a camera module.

In the sixth embodiment, the effective focal length of the optical system 10 is indicated by f, and f=4.11 mm. The f-number is indicated by FNO, and FNO=2.48. The maximum angle of field of view (diagonal angle of field of view) is indicated by FOV, and FOV=38.5°. The total optical length is indicated by TTL, and TTL=5.21 mm.

In addition, various parameters of the lenses of the optical system 100 are shown in Table 11 and Table 12. Definitions of the various parameters can be obtained from the first embodiment, and which will not be repeated herein.

TABLE 11

Sixth Embodiment
f = 4.11 mm, FNO = 2.48, FOV = 38.5°, TTL = 5.21 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | 30.000 | | | | |
| 1 | First Lens | Aspherical | 1.491 | 1.141 | Plastic | 1.545 | 55.93 | 2.089 |
| 2 | | Aspherical | −3.539 | 0.030 | | | | |
| 3 | Second Lens | Aspherical | −10.118 | 0.230 | Plastic | 1.639 | 23.26 | −2.918 |
| 4 | | Aspherical | 2.331 | 0.557 | | | | |
| 5 | Stop | Spherical | Infinite | 0.718 | | | | |
| 6 | Third Lens | Aspherical | 41.985 | 0.637 | Plastic | 1.545 | 55.93 | −2.752 |
| 7 | | Aspherical | 1.442 | 0.064 | | | | |
| 8 | Fourth Lens | Aspherical | 1.339 | 0.493 | Plastic | 1.639 | 23.26 | 3.545 |
| 9 | | Aspherical | 2.765 | 0.217 | | | | |
| 10 | Infrared Cut-off Filter | Spherical | Infinite | 0.210 | Glass | 1.517 | 64.17 | |
| 11 | | Spherical | Infinite | 0.912 | | | | |
| 12 | Imaging Surface | Spherical | Infinite | 0.000 | | | | |

Note:
the reference wavelength is 555 nm

TABLE 12

Sixth Embodiment
Aspheric Coefficient

| Surface Number | 1 | 2 | 3 | 4 |
|---|---|---|---|---|
| K | −2.2728E−01 | −2.5634E+01 | −9.9000E+01 | −3.3953E+00 |
| A4 | 2.2740E−03 | −1.8959E−02 | −5.3687E−02 | −1.9264E−02 |
| A6 | −1.1532E−02 | 8.3877E−02 | 1.0184E−01 | 8.7922E−02 |
| A8 | 5.1862E−02 | 1.3818E−01 | 9.1539E−01 | 1.4173E+00 |
| A10 | −1.4606E−01 | −1.1767E+00 | −4.9546E+00 | −9.3935E+00 |
| A12 | 2.4526E−01 | 2.6511E+00 | 1.2063E+01 | 3.3159E+01 |
| A14 | −2.5777E−01 | −3.1696E+00 | −1.7027E+01 | −7.1306E+01 |
| A16 | 1.6322E−01 | 2.1721E+00 | 1.4349E+01 | 9.3156E+01 |
| A18 | −5.7630E−02 | −8.0632E−01 | −6.7074E+00 | −6.7348E+01 |
| A20 | 8.5531E−03 | 1.2600E−01 | 1.3403E+00 | 2.0603E+01 |

| Surface Number | 6 | 7 | 8 | 9 |
|---|---|---|---|---|
| K | 4.0000E+01 | −6.7714E+00 | −9.8237E+00 | −2.8816E+01 |
| A4 | −9.3790E−02 | −3.3908E−01 | −9.9614E−02 | 8.3946E−03 |
| A6 | 7.4476E−02 | 4.8124E−01 | −4.6757E−01 | −3.8119E−01 |
| A8 | −5.4321E−01 | 3.3038E−01 | 2.1510E+00 | 9.6043E−01 |
| A10 | 2.8240E+00 | −2.3739E+00 | −4.3899E+00 | −1.4753E+00 |
| A12 | −1.0282E+01 | 4.3383E+00 | 5.5464E+00 | 1.5114E+00 |
| A14 | 2.1993E+01 | −4.4600E+00 | −4.5617E+00 | −1.0176E+00 |
| A16 | −2.6675E+01 | 2.7430E+00 | 2.3580E+00 | 4.2629E−01 |
| A18 | 1.6989E+01 | −9.3663E−01 | −6.8923E−01 | −9.9614E−02 |
| A20 | −4.3993E+00 | 1.3590E−01 | 8.6080E−02 | 9.8235E−03 |

From the above data, the following data can be obtained.

| Sixth Embodiment | | | |
|---|---|---|---|
| OBL (mm) | 30 | f1/f2 | −0.716 |
| SL/TTL | 0.624 | CT3/CT2 | 2.77 |
| DT11/DT42 | 0.873 | R1/R9 | 0.539 |
| SAG31/CT3 | −0.104 | (f2 + f4)/f | 0.153 |
| |SAG41|/CT4 | 0.327 | TTL/ImgH | 2.64 |

Figure 13:
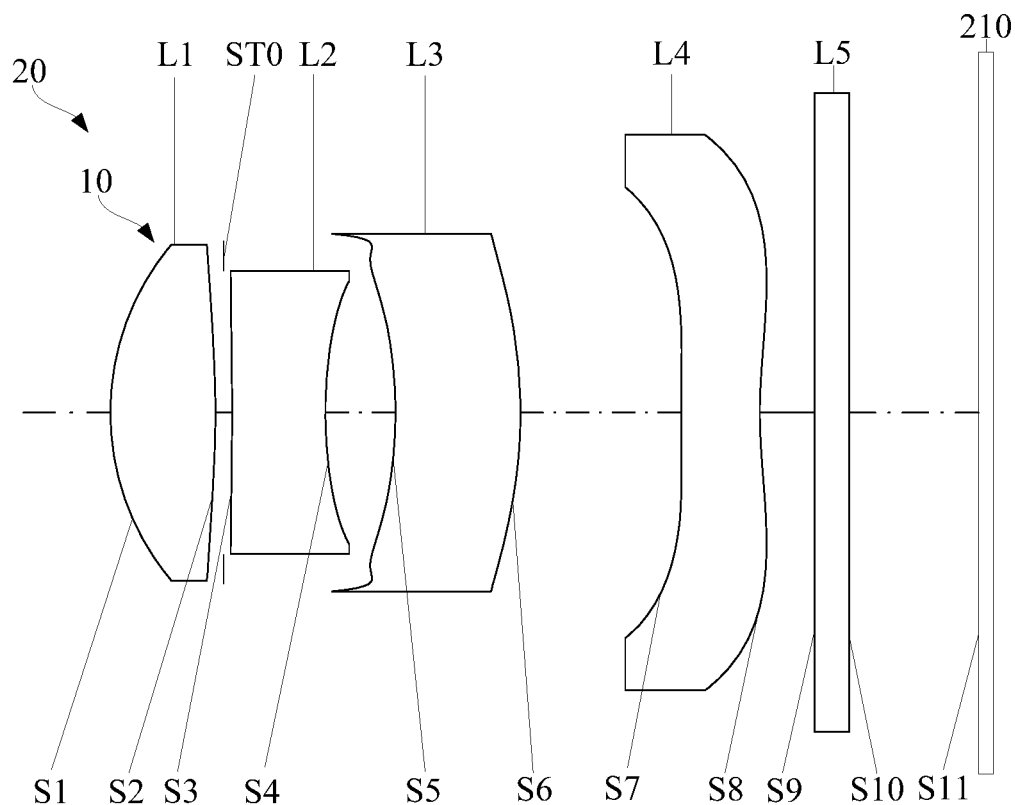
FIG. 13 is a schematic view of a camera module according to an embodiment of the present disclosure.

Referring to FIG. 13, in an embodiment according to the present disclosure, the optical system 10 and a photosensitive element 210 are assembled to form a camera module 20. As such, in this embodiment, an infrared cut-off filter L5 is arranged between the fourth lens L4 and the photosensitive element 210. The photosensitive element 210 may be a Charge Coupled Device (CCD) or a Complementary Metal Oxide Semiconductor (CMOS). By adopting the optical system 10, the camera module 20 has the characteristics of a small angle of field of view, a small depth of field, and a blurred background. In addition, when the camera module 20 is applied to macro capturing, the relative brightness at the edge of field of view will be increased, such that the imaging quality during macro capturing can be effectively improved.

In some embodiments, the distance between the photosensitive element 210 and each of the lenses in the optical system 10 is relatively fixed. As such, the camera module 20 is a fixed focus module. In other embodiments, a driving mechanism such as a voice coil motor may be provided to enable the photosensitive element 210 to move relative to each of the lenses in the optical system 10, thereby achieving a focusing effect. In some embodiments, a driving mechanism can also be provided to drive part of the lenses in the optical system 10 to move, so as to achieve an optical zooming effect.

Figure 14:
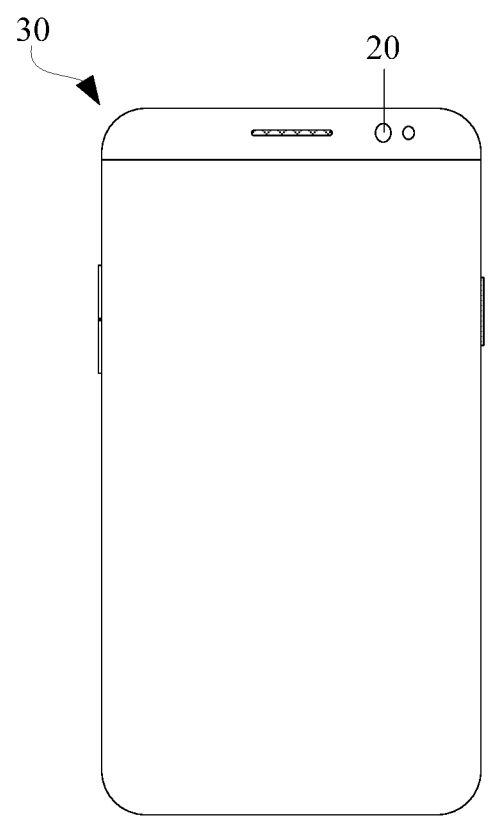
FIG. 14 is a schematic view of an electronic device according to an embodiment of the present disclosure.

Referring to FIG. 14, some embodiments of the present disclosure further provide an electronic device 30. The camera module 20 is applied to the electronic device 30. Specifically, the electronic device 30 includes a housing. The camera module 20 is mounted on the housing. The electronic device 30 includes, but is not limited to, smart phones, smart watches, e-book readers, in-vehicle camera devices, monitoring devices, medical devices (such as endoscopes), tablet computers, biometric devices (such as fingerprint recognition devices or pupil recognition devices), personal digital assistants (PDAs), drone, etc. By adopting the above camera module 20, the electronic device 30 has the characteristics of a small angle of field of view, a small depth of field, and a blurred background during capturing, and will have excellent imaging quality especially during macro capturing.

Specifically, in some embodiments, the camera module 20 is applied to a smart phone. The smart phone includes a middle frame and a circuit board provided in the middle frame. The camera module 20 is mounted in the middle frame of the smart phone. The photosensitive element therein is electrically connected to the circuit board. The camera module 20 can be used as a front camera module or a rear camera module of a smart phone.

The "electronic device" used in the embodiments of the present disclosure may include, but is not limited to, a device configured to be connected via a wired line connection (such as via a public switched telephone network (PSTN), digital subscriber line (DSL), digital cable, direct cable connection, and/or another data connection/network) and/or receive/transmit communication signals via an wireless interface (for example, for a cellular network, a wireless local area network (WLAN), a digital TV network such as digital video broadcasting handheld (DVB-H) network, a satellite network, an amplitude modulation-frequency modulation (AM-FM) broadcast transmitter, and/or another communication terminal). The electronic device configured to communicate via the wireless interface may be referred to as a "wireless communication terminal", a "wireless terminal" and/or a "mobile terminal". Examples of the mobile terminal include, but is not limited to satellite or cellular phones; personal communication system (PCS) terminals that can combine cellular radio phones with data processing, fax, and data communication capabilities. Examples of the mobile terminal can include a radio phone, a pager, an Internet/intranet access, a Web browser, a memo pad, a calendar, and/or a personal digital assistant (PDA) of the global positioning system (GPS) receiver; and conventional laptop and/or handheld receiver or other electronic device including a radio phone transceiver.

In the description of the present disclosure, it should be understood that orientation or positional conditions indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless explicitly specified and defined otherwise, terms "mounting", "connecting", "connected", and "fixing" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction condition between two elements, unless explicitly defined otherwise. The specific meanings of the above terms in the present disclosure can be understood by one of those ordinary skills in the art according to specific circumstances.

In the present disclosure, unless expressly specified and defined otherwise, a first feature being "on" or "below" a second feature may mean that the first feature is in direct contact with the second feature, or may mean that the first feature is indirectly contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

In the description of this specification, descriptions referring to terms "one embodiment", "some embodiments", "examples", "specific examples", or "some examples" and the like mean that specific features, structures, materials, or characteristics described in conjunction with the embodiment or example are included in at least one embodiment or example of the present disclosure. In this specification, schematic representations of the above terms do not necessarily refer to the same embodiment or example. Moreover, the described specific features, structures, materials, or characteristics can be combined in any one or more embodiments or examples in a suitable manner. In addition, if there is no contradiction, the different embodiments or examples and the features of the different embodiments or examples described in this specification can be combined and incorporated by those skilled in the art.

The technical features of the above-mentioned embodiments can be combined arbitrarily. In order to simply the description, all possible combinations of the technical features in the above-mentioned embodiments are not described. However, as long as there is no contradiction in the combinations of these technical features, they should be considered to be fallen into the range described in the present specification.

Only several embodiments of the present disclosure are illustrated in the above-mentioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. An optical system, comprising, successively in order from an object side to an image side:
   a first lens having a positive refractive power;
   a second lens having a refractive power;
   a third lens having a refractive power; and
   a fourth lens having a refractive power, an image side surface of the fourth lens being concave on an optical axis, an object side surface and the image side surface of the fourth lens being aspherical, and at least one of the object side surface and the image side surface of the fourth lens having an inflection point;
   wherein the optical system further comprises a stop arranged between an object side of the first lens to the fourth lens; and
   the optical system satisfies the conditions:

$0.5 < SL/TTL < 0.9$, $-1 < SAG31/CT3 < 0$, and $20 \text{ mm} < OBL < 40 \text{ mm}$;

wherein SL is a distance from the stop to an imaging surface of the optical system on the optical axis, TTL is a distance from an object side surface of the first lens to the imaging surface of the optical system on the optical axis, and SAG31 is a vector height of an object side surface of the third lens, and CT3 is a thickness of the third lens on the optical axis; and
   wherein OBL is a distance from a subject to be imaged by the optical system to the object side surface of the first lens on the optical axis.

2. The optical system according to claim 1, further satisfying a condition:

$0.4 < DT11/DT42 < 0.9$;

where DT11 is a maximum effective semiaperture of the object side surface of the first lens, and DT42 is a maximum effective semiaperture of the image side surface of the fourth lens.

3. The optical system according to claim 1, further satisfying a condition:

$0.1 < |SAG41|/CT4 < 2.0$;

wherein SAG41 is a vector height of the object side surface of the fourth lens, CT4 is a thickness of the fourth lens on the optical axis.

4. The optical system according to claim 1, further satisfying a condition:

$-1 \leq f1/f2 < 0$;

wherein f1 is an effective focal length of the first lens, and f2 is an effective focal length of the second lens.

5. The optical system according to claim 1, further satisfying a condition:

$0 < f1/f2 \leq 1$;

wherein f1 is an effective focal length of the first lens, and f2 is an effective focal length of the second lens.

6. The optical system according to claim 1, further satisfying a condition:

$2.45 \leq FNO \leq 3.55$;

wherein FNO is an f-number of the optical system.

7. The optical system according to claim 1, further satisfying a condition:

$0.5 < CT3/CT2 < 3.0$;

wherein CT2 is a thickness of the second lens on the optical axis.

8. The optical system according to claim 1, further satisfying a condition:

$0.1 < R1/R9 < 0.7$;

wherein R1 is a radius of curvature of the object side surface of the first lens at the optical axis, and R9 is a radius of curvature of the image side surface of the fourth lens at the optical axis.

9. The optical system according to claim 1, further satisfying a condition:

$-3 < (f2+f4)/f < 1$;

wherein f2 is an effective focal length of the second lens, f4 is an effective focal length of the fourth lens, and f is an effective focal length of the optical system.

10. The optical system according to claim 1, wherein the stop is arranged between the first lens and the second lens.

11. The optical system according to claim 1, wherein the stop is arranged between the second lens and the third lens.

12. The optical system according to claim 1, wherein at least one of the first lens, the second lens, the third lens, and the fourth lens is made of plastic.

13. The optical system according to claim 1, wherein at least one object side surface of the first lens, the second lens, the third lens, and the fourth lens is aspherical.

14. The optical system according to claim 1, wherein at least one image side surface of the first lens, the second lens, the third lens, and the fourth lens is aspherical.

15. The optical system according to claim 1, wherein the image side surface of the fourth lens is concave at the optical axis, and is convex at a circumference thereof.

16. A camera module, comprising:
a photosensitive element; and
the optical system according to claim 1, wherein the photosensitive element is arranged on an image side of the fourth lens.

17. The camera module according to claim 16, wherein the camera module satisfies the following condition:

$$TTL/\text{ImgH} < 2.65;$$

wherein ImgH is half of a diagonal length of an effective pixel area on the photosensitive element.

18. An electronic device, comprising:
a housing; and
the camera module according to claim 16,
wherein the camera module is provided on the housing.

19. An optical system, comprising, successively in order from an object side to an image side:
a first lens having a positive refractive power;
a second lens having a refractive power;
a third lens having a refractive power; and
a fourth lens having a refractive power, an image side surface of the fourth lens being concave on an optical axis, an object side surface and the image side surface of the fourth lens being aspherical, and at least one of the object side surface and the image side surface of the fourth lens having an inflection point;

wherein the optical system further comprises a stop arranged between an object side of the first lens to the fourth lens; and the optical system satisfies the conditions:

$$0.5 < SL/TTL < 0.9,$$

$$-1 < SAG31/CT3 < 0,$$

$$20 \text{ mm} < OBL < 40 \text{ mm, and}$$

$$FNO \leq 3.55;$$

wherein SL is a distance from the stop to an imaging surface of the optical system on the optical axis, TTL is a distance from an object side surface of the first lens to the imaging surface of the optical system on the optical axis, and SAG31 is a vector height of an object side surface of the third lens, and CT3 is a thickness of the third lens on the optical axis;

wherein OBL is a distance from a subject to be imaged by the optical system to the object side surface of the first lens on the optical axis; and wherein FNO is an f-number of the optical system.

* * * * *